(12) United States Patent
Morita et al.

(10) Patent No.: US 10,209,697 B2
(45) Date of Patent: Feb. 19, 2019

(54) DEVICE AND METHOD OF CONTROLLING MACHINE TOOL, TO CONTROL SYNCHRONIZED OPERATION OF SPINDLE AXIS AND FEED AXIS

(71) Applicant: FANUC CORPORATION, Yamanashi (JP)

(72) Inventors: Yuuki Morita, Yamanashi (JP);
Daisuke Tajima, Yamanashi (JP);
Tadashi Okita, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 33 days.

(21) Appl. No.: 15/468,279

(22) Filed: Mar. 24, 2017

(65) Prior Publication Data

US 2017/0277160 A1   Sep. 28, 2017

(30) Foreign Application Priority Data

Mar. 25, 2016 (JP) ................................. 2016-062610

(51) Int. Cl.
*G05B 19/29* (2006.01)
*G05B 19/416* (2006.01)

(52) U.S. Cl.
CPC ......... *G05B 19/29* (2013.01); *G05B 19/4163* (2013.01); *G05B 2219/37618* (2013.01); *G05B 2219/45215* (2013.01); *G05B 2219/45216* (2013.01); *G05B 2219/50118* (2013.01); *G05B 2219/50225* (2013.01); *G05B 2219/50226* (2013.01)

(58) Field of Classification Search
CPC .......... G05B 19/29; G05B 2219/37618; G05B 2219/50118
See application file for complete search history.

(56) References Cited

U.S. PATENT DOCUMENTS

| | | | |
|---|---|---|---|
| 5,132,912 A * | 7/1992 | Ito ........................ | G05B 19/186 318/571 |
| 2013/0039707 A1 * | 2/2013 | Takayama ............ | G05B 19/416 408/9 |

FOREIGN PATENT DOCUMENTS

JP          2629729 B2  *  7/1997
JP       2003-181722       7/2003
(Continued)

*Primary Examiner* — Yuhui R Pan
(74) *Attorney, Agent, or Firm* — Hauptman Ham, LLP

(57) ABSTRACT

A controller for controlling a synchronized operation of spindle and feed axes. A spindle-axis control section includes an initial-motion control section for accelerating a spindle axis from a starting position; a maximum-acceleration detecting section for detecting a maximum acceleration of the spindle axis during acceleration; a residual rotation-amount detecting section for detecting a residual rotation amount of the spindle axis; a current-speed detecting section for detecting a current speed of the spindle axis; a decelerating-motion control section for decelerating the spindle axis to reach an intermediate speed, after the acceleration; a positioning-motion control section for decelerating the spindle axis to reach the target position after reaching the intermediate speed; and a torque-command limiting section for limiting a fluctuation of a torque command of the position control, instructed to the spindle axis, to a predetermined range over a period until a predetermined elapse condition is satisfied after reaching the intermediate speed.

13 Claims, 15 Drawing Sheets

(56) References Cited

FOREIGN PATENT DOCUMENTS

| JP | 2004-141991 | 5/2004 |
| JP | 3553741 B2 | 8/2004 |
| JP | 2013-250866 A | 12/2013 |
| JP | 2015-138450 A | 7/2015 |

\* cited by examiner

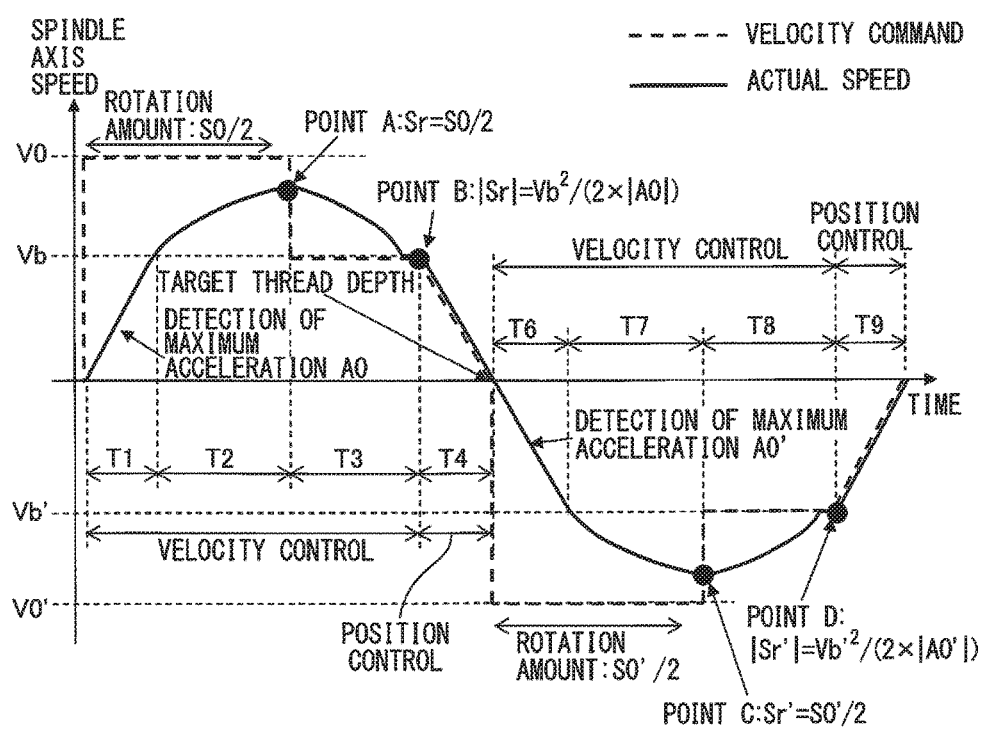

DEVICE AND METHOD OF CONTROLLING MACHINE TOOL, TO CONTROL SYNCHRONIZED OPERATION OF SPINDLE AXIS AND FEED AXIS

RELATED APPLICATIONS

The present application claims priority to Japanese Patent Application No. 2016-062610 filed Mar. 25, 2016, the disclosures of which is hereby incorporated by reference herein in its entirety.

BACKGROUND OF THE INVENTION

1. Field of the Invention

The present invention relates to a device of controlling a machine tool, to control a synchronized operation of a spindle axis and a feed axis. The present invention also relates to a method of controlling a machine tool, to control a synchronized operation of a spindle axis and a feed axis.

2. Description of the Related Art

In a machine tool capable of performing a tapping process by a synchronized operation of a spindle (or principal) axis and a feed axis, various kinds of configurations for improving processing accuracy and reducing cycle time have been proposed. For example, Japanese Patent No. 2629729 (JP2629729B) discloses a thread forming apparatus that performs a tapping process by operating a feed axis to follow the rotation of a spindle axis, in which a feed command value for the feed axis is computed based on the rotational speed and rotational acceleration of the spindle axis and a thread pitch, and the feed command value is corrected in accordance with the actual rotational position of the spindle axis, so as to improve tapping accuracy. On the other hand, Japanese Patent No. 3553741 (JP3553741B) discloses a method of acceleration and deceleration control of a spindle motor, executed by a numerical control unit that performs synchronization control of a spindle axis and a feed axis for a tapping process, in which the numerical control unit prepares an acceleration and deceleration command in conformity with the power characteristics of the spindle axis, and controls the spindle axis based on the acceleration and deceleration command to improve the response of the spindle axis, so as to reduce cycle time.

SUMMARY OF THE INVENTION

In a machine tool capable of performing a tapping process by a synchronized operation of a spindle axis and a feed axis, cycle time is generally determined depending on the acceleration capacity of the spindle axis. It is desirable to reduce cycle time by controlling the spindle axis so as to maximize the acceleration capacity thereof with a simple configuration, without performing a preliminary work requiring a high-level skill, such as a parameter setting or adjustment, etc., required for a numerical control unit to prepare acceleration and deceleration commands in conformity with the power characteristics of the spindle axis. Further, it is desirable, during the rotational motion of the spindle axis, to reduce a mechanical or structural shock that may be caused on the spindle axis due to the change in acceleration, and to reduce a synchronization error that may be caused between the spindle axis and the feed axis due to the change in acceleration.

One aspect of the invention provides a controller of a machine tool, configured to control a synchronized operation of a spindle axis and a feed axis, the controller comprising a numerical control section configured to prepare a spindle-axis command and a feed-axis command based on a tapping program; a spindle-axis control section configured to control a rotational motion of the spindle axis in accordance with the spindle-axis command; a rotation detecting section configured to detect a rotational position of the spindle axis; and a feed-axis control section configured to control a feed motion of the feed axis in accordance with the feed-axis command, based on the rotational position. The numerical control section comprises a spindle-axis command outputting section configured to obtain, from the tapping program, a total rotation amount and a maximum rotation speed of the spindle axis during a period when the spindle axis operates from a starting position to a target position, and to send the total rotation amount and the maximum rotation speed as the spindle-axis command to the spindle-axis control section. The spindle-axis control section comprises an initial-motion control section configured to make the spindle axis perform an accelerated rotation at maximum capacity from the starting position, by a velocity control in which the maximum rotation speed is set as a target value; a maximum-acceleration detecting section configured to detect a maximum acceleration of the spindle axis during the accelerated rotation at maximum capacity, based on the rotational position; a residual rotation-amount detecting section configured to detect a residual rotation amount of the spindle axis during a period when the spindle axis operates from a current position to the target position, based on the total rotation amount and the rotational position; a current-speed detecting section configured to detect a current speed of the spindle axis based on the rotational position; a decelerating-motion control section configured to execute a velocity control for making the spindle axis perform a decelerated rotation so as to reach a predetermined intermediate speed, based on the residual rotation amount and the current speed, after the accelerated rotation at maximum capacity; a positioning-motion control section configured to execute a position control for making the spindle axis perform a decelerated rotation at a maximum deceleration corresponding to the maximum acceleration so as to reach the target position, based on the residual rotation amount and the current speed, after the spindle axis reaches the intermediate speed; and a torque-command limiting section configured to limit a fluctuation of a torque command of the position control, instructed from the positioning-motion control section to the spindle axis, to a predetermined range over a time period from a point when the spindle axis reaches the intermediate speed to a point when a predetermined elapse condition is satisfied.

Another aspect of the invention provides a method of controlling a machine tool, configured to control a synchronized operation of a spindle axis and a feed axis, the method comprising the steps, executed by a controller, of obtaining, from a tapping program, a total rotation amount and a maximum rotation speed of the spindle axis during a period when the spindle axis operates from a starting position to a target position; making the spindle axis perform an accelerated rotation at maximum capacity from the starting position, by a velocity control in which the maximum rotation speed is set as a target value; detecting a maximum acceleration of the spindle axis during the accelerated rotation at maximum capacity, based on a rotational position feedback of the spindle axis; detecting a residual rotation amount of the spindle axis during a period when the spindle axis operates from a current position to the target position, based on the total rotation amount and the rotational position feedback; detecting a current speed of the spindle axis based on the rotational position feedback; executing a velocity control for making the spindle axis perform a decelerated rotation so as to reach a predetermined intermediate speed, after the accelerated rotation at maximum capacity; executing a position control for making the spindle axis perform a decelerated rotation at a maximum deceleration corresponding to the maximum acceleration so as to reach the target position, based on the residual rotation amount and the current speed, after the spindle axis reaches the intermediate speed; and limiting a fluctuation of a torque command of the position control, instructed to the spindle axis, to a predetermined range over a time period from a point when the spindle axis reaches the intermediate speed to a point when a predetermined elapse condition is satisfied.

The controller according to one aspect has a configuration wherein, when the spindle axis performs the rotational motion from the starting position to the target position, the numerical control section instructs only the total rotation amount and the maximum rotation speed, of the spindle axis, as the spindle axis command to the spindle-axis control section, and the spindle-axis control section performs, in accordance with the spindle axis command, the rotational motion by accelerating the spindle axis with the maximum power using the maximum permissible current, aiming at the maximum rotation speed, and continuously performs, based on the sequentially detected residual rotation amount and current speed of the spindle axis, the rotational motion until the target position while decelerating the spindle axis at the maximum or appropriate deceleration so as to make the spindle axis reach the target position. Accordingly, it is no longer necessary to perform a parameter setting or adjustment, etc., required for the numerical control section to prepare acceleration and deceleration commands in conformity with the power characteristics of the spindle axis, and it is possible, with a simple configuration, to reduce the cycle time of a tapping process by executing an acceleration and deceleration control so as to maximize the acceleration capacity of the spindle axis. Further, the controller has a configuration wherein, during the decelerated rotation of the spindle axis, the spindle-axis control section limits a fluctuation of a torque command of the position control, which is instructed to the spindle axis, to a predetermined range over a predetermined period after the current speed reaches the intermediate speed. Consequently, a change in acceleration during the decelerated rotation of the spindle axis is able to be suppressed, and therefore, it is possible to reduce a mechanical or structural shock that may be caused on the spindle axis due to the change in acceleration, and to reduce a synchronization error that may be caused between the spindle axis and the feed axis due to the change in acceleration.

In the control method according to the other aspect, effects corresponding to those achieved by the above-described controller can be obtained.

BRIEF DESCRIPTION OF THE DRAWINGS

The objects, features and advantages of the present invention will become more apparent from the following description of the embodiments in connection with the accompanying drawings, wherein:

FIG. 9 is a diagram showing a further example of the motion of a spindle axis, achieved in the embodiment of FIGS. 1-4;

DETAILED DESCRIPTION

Figure 1:
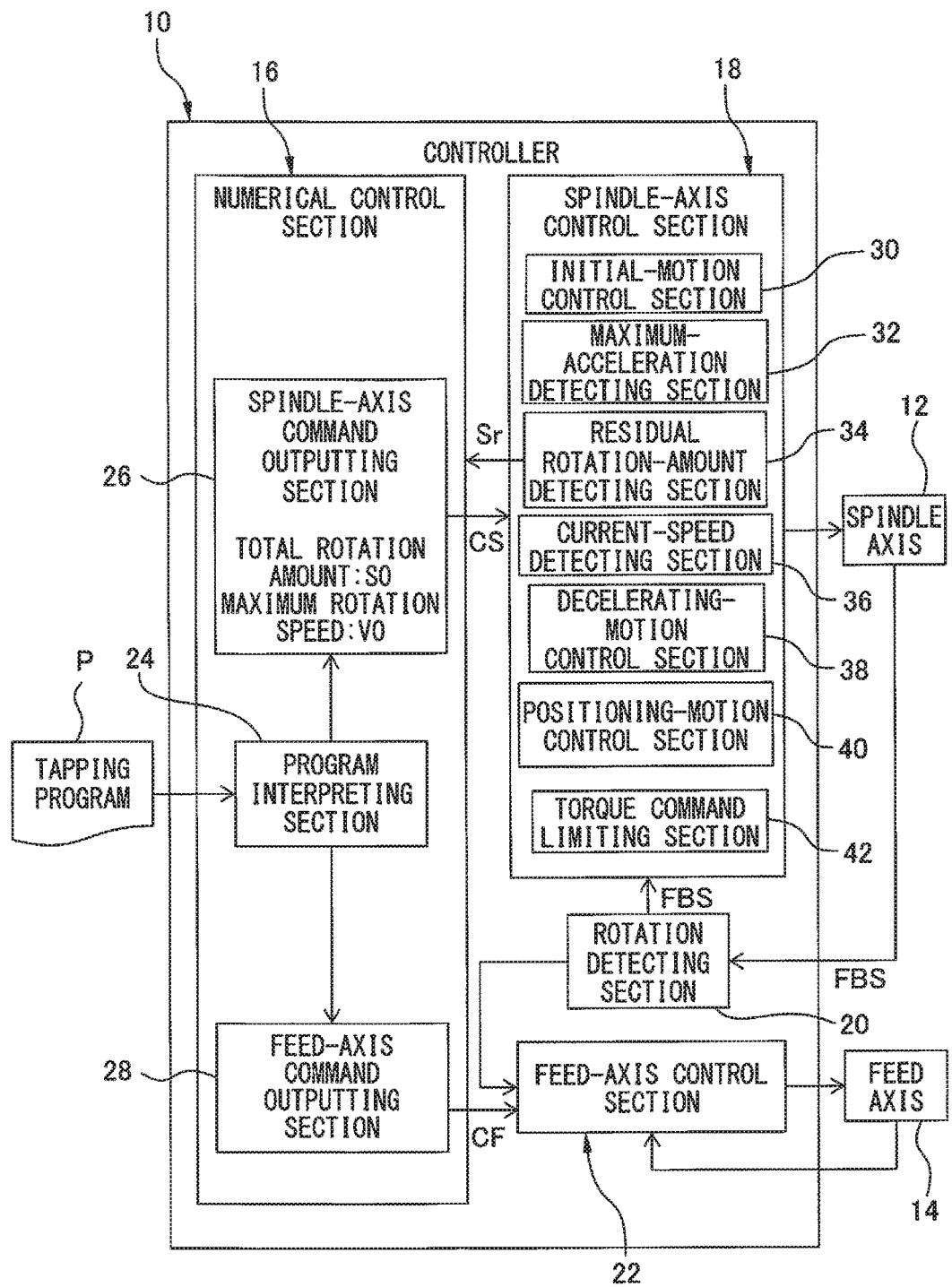
FIG. 1 is a functional block diagram showing a configuration of the first embodiment of a machine tool controller.

Embodiments of the present invention will be described below with reference to the accompanying drawings. Throughout the drawings, corresponding components are denoted by common reference numerals.

FIG. 1 is a functional block diagram showing a configuration of a device 10 of controlling (i.e., a controller 10 of) a machine tool, according to the first embodiment. The controller 10 has a configuration for controlling a synchronized operation (so called a master-slave synchronization) of a spindle axis 12 and a feed axis 14, in a machine tool (e.g., a lathe, a drilling machine, a machining center, etc.) capable of performing a tapping process by the synchronized operation, in which the feed axis 14 operates to follow the rotational motion of the spindle axis 12 by taking into account a thread pitch designated by a tapping program P. The spindle axis 12 is a control axis provided for a spindle motor (not shown) that rotates a hold unit for holding a workpiece or a tool at a necessary speed for processing. The feed axis 14 is a control axis provided for a servo motor (not shown) that feeds a support unit for supporting a workpiece or a tool at a necessary speed for processing. For example, in a lathe, the tool may be linearly fed by the feed axis 14 relative to the workpiece rotated by the spindle axis 12, or alternatively, the workpiece rotated by the spindle axis 12 may be linearly fed by the feed axis 14 relative to the tool. On the other hand, in a drilling machine, the tool rotated by the spindle axis 12 may be linearly fed by the feed axis 14 relative to the workpiece, or alternatively, the workpiece may be linearly fed by the feed axis 14 relative to the tool rotated by the spindle axis 12. In any of the cases, the feed axis 14 that has a relatively wide margin of acceleration/deceleration torque during operation operates to follow the spindle axis 12 that has a relatively less margin of acceleration/deceleration torque during operation, whereby it is possible to reduce a synchronization error and improve a processing accuracy. It should be noted that in the present invention the configuration of the machine tool is not particularly limited.

The controller 10 includes a numerical control section 16 configured to prepare a spindle-axis command CS and a feed-axis command CF, based on a tapping program P; a spindle-axis control section 18 configured to control a rotational motion of the spindle axis 12 in accordance with the spindle-axis command CS; a rotation detecting section 20 configured to detect a rotational position of the spindle axis 12; and a feed-axis control section 22 configured to control a feed motion of the feed axis 14 in accordance with the feed-axis command CF, based on the rotational position detected by the rotation detecting section 20. The numerical control section 16 includes a program interpreting section 24 configured to interpret the tapping program P; a spindle-axis command outputting section 26 configured to prepare the spindle-axis command CS in accordance with the interpretation of the program interpreting section 24 and send the spindle-axis command CS to the spindle-axis control section 18; and a feed-axis command outputting section 28 configured to prepare the feed-axis command CF in accordance with the interpretation of the program interpreting section 24 and send the feed-axis command CF to the feed-axis control section 22. The numerical control section 16 may include a hardware configuration of a conventional CNC unit.

Before starting a tapping process, the spindle-axis command outputting section 26 obtains, from a command value provided in the tapping program P interpreted by the program interpreting section 24, a total rotation amount S0 and a maximum rotation speed V0, of the spindle axis 12, during a period when the spindle axis operates from a starting position (a rotational position) to a target position (a rotational position), and sends the total rotation amount S0 and the maximum rotation speed V0 as the spindle-axis command CS to the spindle-axis control section 18. For example, in the case where the tapping program P includes instructions for processing an internal thread having a thread pitch of 1.25 mm and a thread depth of 30 mm with the maximum rotation speed (maximum revolutions per minute, in this example) V0 of the spindle axis 12 set at 3000 rev/min, the total rotation amount S0 of the spindle axis 12, from a process start position as the starting position to a target thread depth as the target position, is calculated as 30÷1.25=24 (rev). Accordingly, the spindle-axis command outputting section 26 notifies the spindle-axis control section 18 of V0=3000 (rev/min) and S0=24 (rev). In this way, the spindle-axis command CS does not include a position command (or movement command) and/or an acceleration/deceleration command, which makes the spindle axis 12 perform a rotational motion until the target position (or target thread depth).

The spindle-axis control section 18 controls the rotational motion of the spindle axis 12 by a conventional feedback control, with use of a rotational position FBS (i.e., a feedback value) of the spindle axis 12 detected by the rotation detecting section 20. The feed-axis control section 22 controls the feed motion of the feed axis 14, which follows the motion of the spindle axis 12, by a feedback control, with use of the rotational position FBS of the spindle axis 12 in addition to the feedback value of the feed position of the feed axis 14. The rotation detecting section 20 can obtain the rotational position FBS from the output of a position detector (not shown), such as an encoder, etc., for detecting the operating position of the spindle 12 or the spindle motor.

The spindle-axis control section 18 includes an initial-motion control section 30 configured to make the spindle axis 12 perform an accelerated rotation at maximum capacity from the starting position, by a velocity control in which the maximum rotation speed V0, sent from the spindle-axis command outputting section 26, is set as a target value; a maximum-acceleration detecting section 32 configured to detect a maximum acceleration A0 (unit may be represented as, e.g., rev/mini) of the spindle axis 12 during the accelerated rotation at maximum capacity, based on the rotational position FBS; a residual rotation-amount detecting section 34 configured to detect a residual rotation amount Sr of the spindle axis 12 during a period when the spindle axis operates from a current position (a rotational position) to the target position, based on the total rotation amount S0, sent from the spindle-axis command outputting section 26, and the rotational position FBS; a current-speed detecting section 36 configured to detect a current speed Vc of the spindle axis 12 based on the rotational position FBS; a decelerating-motion control section 38 configured to execute a velocity control for making the spindle axis 12 perform a decelerated rotation so as to reach a predetermined intermediate speed Vb, based on the residual rotation amount Sr and the current speed Vc, after the accelerated rotation at maximum capacity; a positioning-motion control section 40 configured to execute a position control for making the spindle axis 12 perform a decelerated rotation at a maximum deceleration corresponding to the maximum acceleration A0 so as to reach the target position, based on the residual rotation amount Sr and the current speed Vc, after the spindle axis 12 reaches the intermediate speed Vb; and a torque-command limiting section 42 configured to limit a fluctuation of a torque command of the position control, instructed from the positioning-motion control section 40 to the spindle axis 12, to a predetermined range over a time period from a point when the spindle axis 12 reaches the intermediate speed Vb to a point when a predetermined elapse condition is satisfied.

The intermediate speed Vb is previously determined for the spindle axis 12 as a rotational speed (i.e., a base speed of the spindle motor) by which an acceleration with a constant torque (i.e., a constant acceleration) can be performed from the start of operation to the speed Vb, and may be stored as one of control parameters in a memory (not shown) of the controller 10. In practice, the intermediate speed Vb may take any value equal to or less than the base speed of the spindle motor (or a speed determined by taking into account a reduction ratio, if any, between the spindle motor and the spindle axis 12).

In the controller 10, the spindle axis 12 makes a transition from the accelerated rotation to the decelerated rotation at an instant when the spindle axis reaches the maximum rotation speed V0 or reaches a position where the residual rotation amount Sr is equal to one-half of the total rotation amount S0. When the spindle axis 12 decelerates from a maximum speed of the accelerated rotation, the decelerating-motion control section 38 executes the velocity control for the spindle axis 12, based on the residual rotation amount Sr and the current speed Vc, which are sequentially detected by the residual rotation-amount detecting section 34 and the current-speed detecting section 36, respectively, in a speed range between the maximum speed and the intermediate speed Vb (further details about the velocity control will be described later). On the other hand, the positioning-motion control section 40 makes the spindle axis 12 perform the decelerated rotation at the maximum deceleration corresponding to the maximum acceleration A0 detected by the maximum-acceleration detecting section 32, in terms of decreased cycle time, in a speed range from the intermediate speed Vb to a point where the spindle axis reaches the target position. Thus, the positioning-motion control section 40 monitors the residual rotation amount Sr and the current speed Vc, which are sequentially detected by the residual rotation-amount detecting section 34 and the current-speed detecting section 36, respectively, and calculates a position at which it is expected that "Sr" becomes equal to zero (i.e., the spindle axis reaches the target position) if the spindle axis 12 is decelerated from the current speed Vc (=Vb) at the maximum deceleration, and starts the position control at an instant when the spindle axis 12 reaches the calculated position (further details about the position control will be described later).

When a control strategy executed by the spindle-axis control section 18 is switched from the velocity control by the decelerating-motion control section 38 to the position control by the positioning-motion control section 40, the acceleration (or deceleration) of the spindle axis 12 immediately before switching is not necessary identical to the acceleration (or deceleration) immediately after switching. If the acceleration of the spindle axis 12 is changed at the switching from the velocity control to the position control, it may be concerned that a mechanical or structural shock is caused on the spindle axis 12 or a synchronization error is caused between the spindle axis 12 and the feed axis 14, due to the change in acceleration. To address the above concerns, the controller 10 has a configuration wherein the torque-command limiting section 42 limits the range of fluctuation of a torque command used in the position control, instructed from the positioning-motion control section 40 to the spindle axis 12, to a predetermined range, over a predetermined time period (that may be referred to as a torque-command limiting period) after the spindle axis 12 reaches the intermediate speed Vb. If the fluctuation of the torque command is limited over the predetermined time period so as to bring the torque command close to a constant value, the acceleration of the spindle axis 12 in the same period comes closer to a constant value accordingly. As a result, a change in acceleration of the spindle axis 12, immediately after the velocity control is switched to the position control, is suppressed, and thereby it is possible to reduce a mechanical or structural shock that may be caused on the spindle axis 12 due to the change in acceleration, and to reduce a synchronization error that may be caused between the spindle axis 12 and the feed axis 14 due to the change in acceleration. Further details of the torque-command limiting procedure executed by the torque-command limiting section 42 will be described rater.

The controller 10 is capable of controlling, in a tapping process using a machine tool, a rotational motion of the spindle axis 12 for cutting a pilot hole of a workpiece with a tool until a target thread depth (referred to as a cutting motion, in this application). Also, the controller 10 is capable of controlling, in a tapping process using a machine tool, a rotational motion of the spindle axis 12 for pulling out a tool from a workpiece after cutting a pilot hole of the workpiece until a target thread depth (referred to as a return motion, in this application). In the control of the cutting motion, the "starting position" corresponds to a "process start position" of the tapping process, and the "target position" corresponds to a "target thread depth" of the tapping process. In the control of the return motion, the "starting position" corresponds to a "target thread depth" of the tapping process, and the "target position" corresponds to a "return completion position" of the tapping process.

Figure 2:
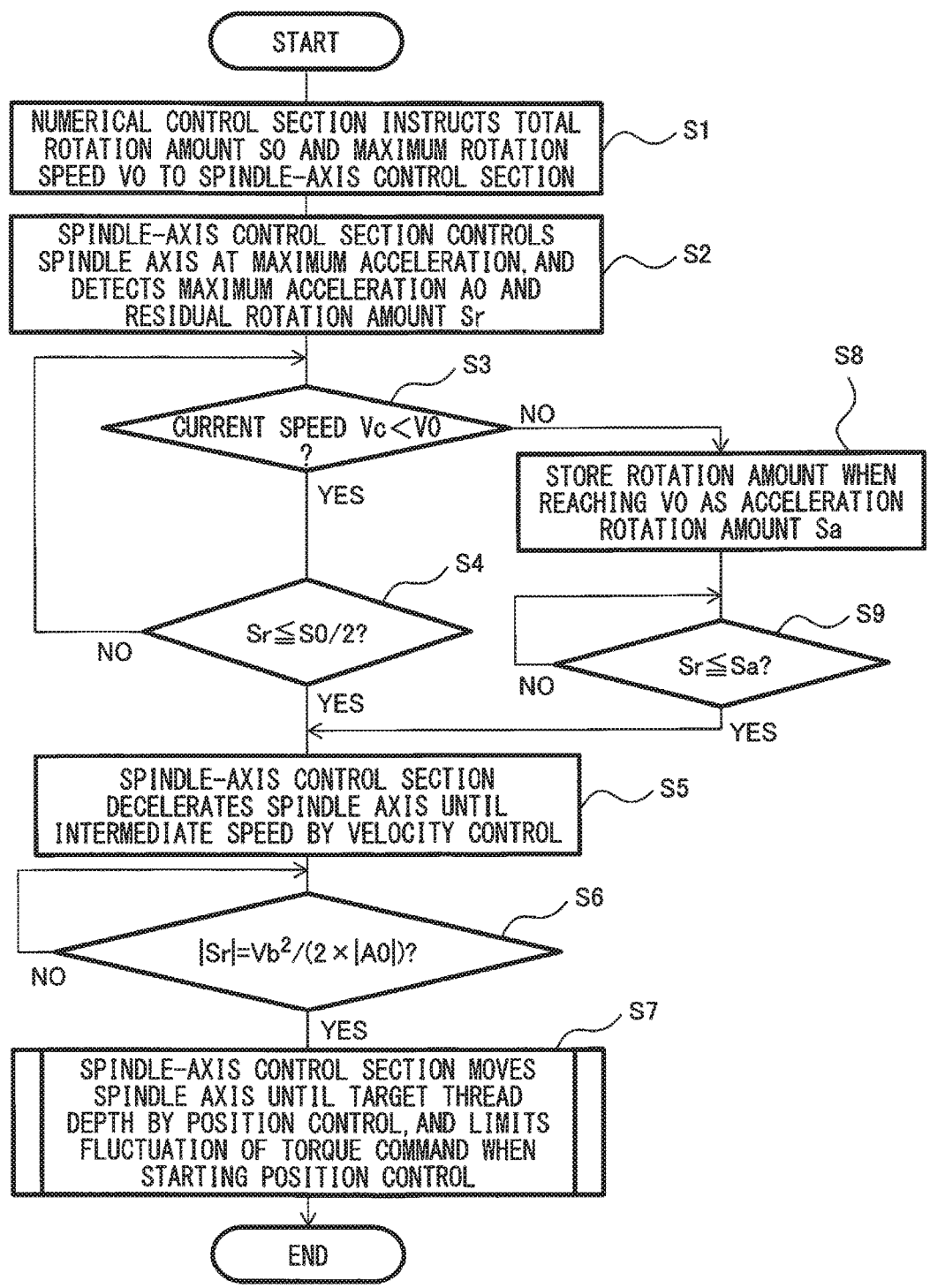
FIG. 2 is a flowchart showing a cutting motion control method for a tapping process, which is the first embodiment of a machine tool control method.
Figure 3:
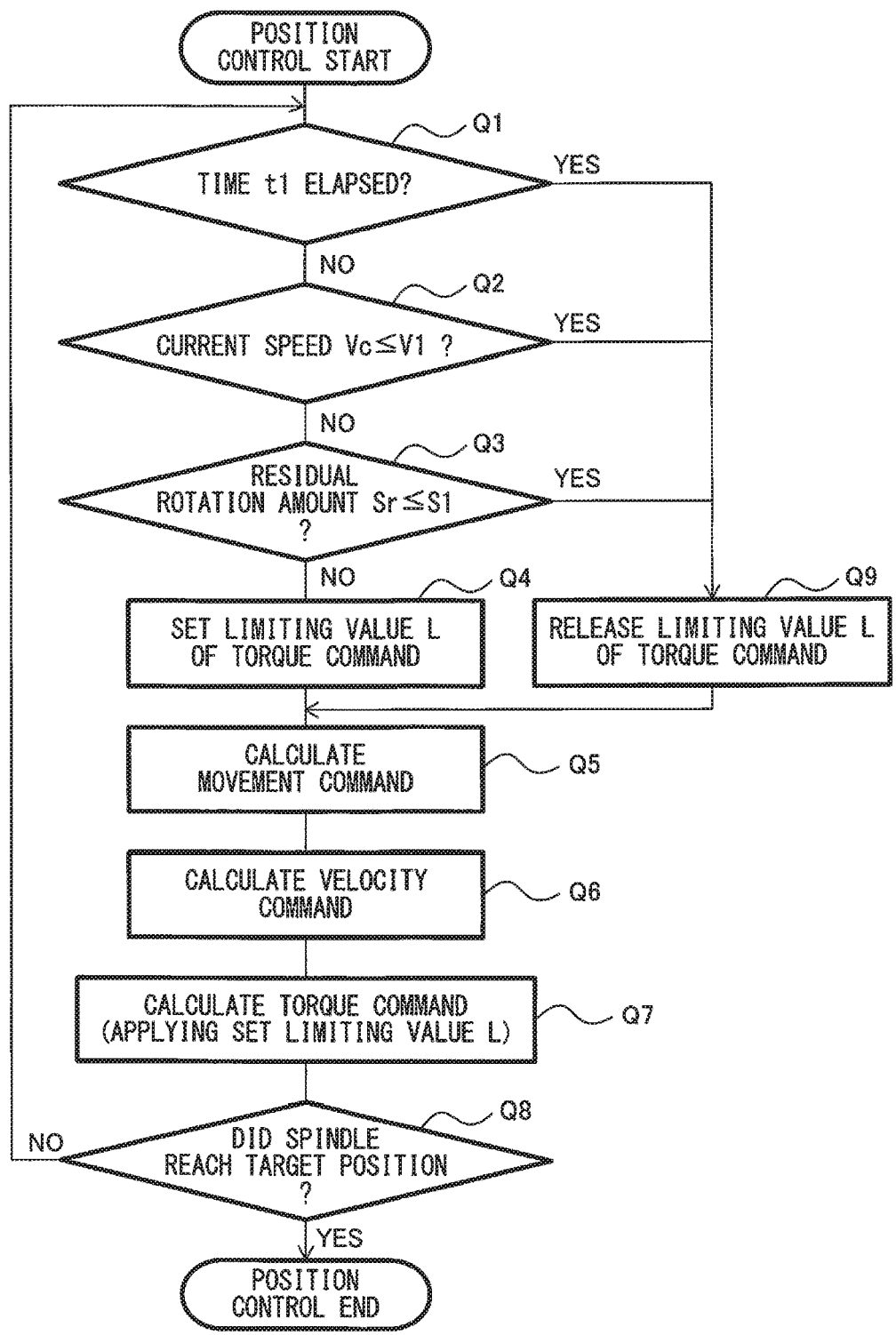
FIG. 3 is a flowchart showing a position control routine in the embodiment of FIG. 2.
Figure 4:
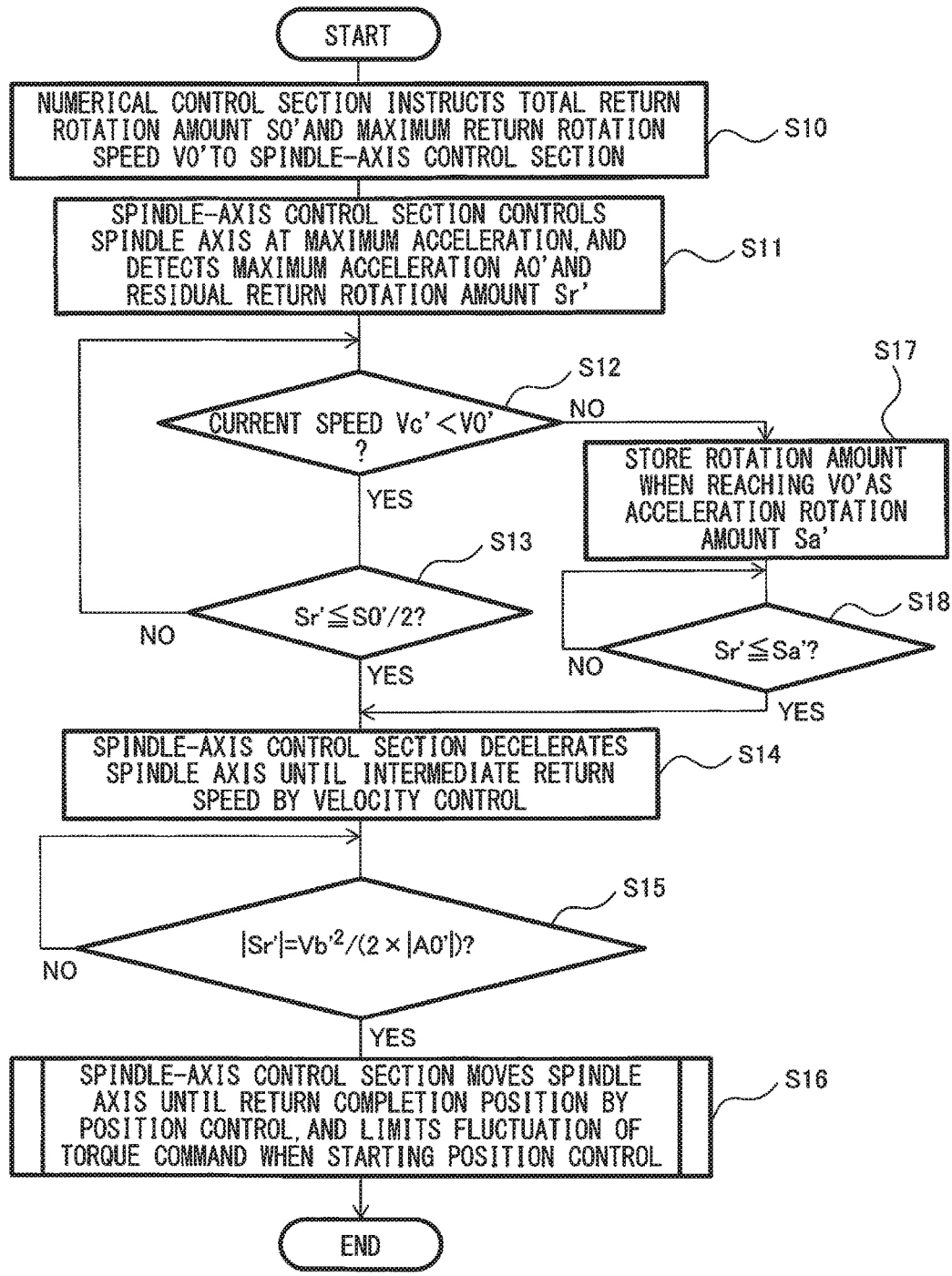
FIG. 4 is a flowchart showing a return motion control method for a tapping process, which is the first embodiment of a machine tool control method.
Figure 5:
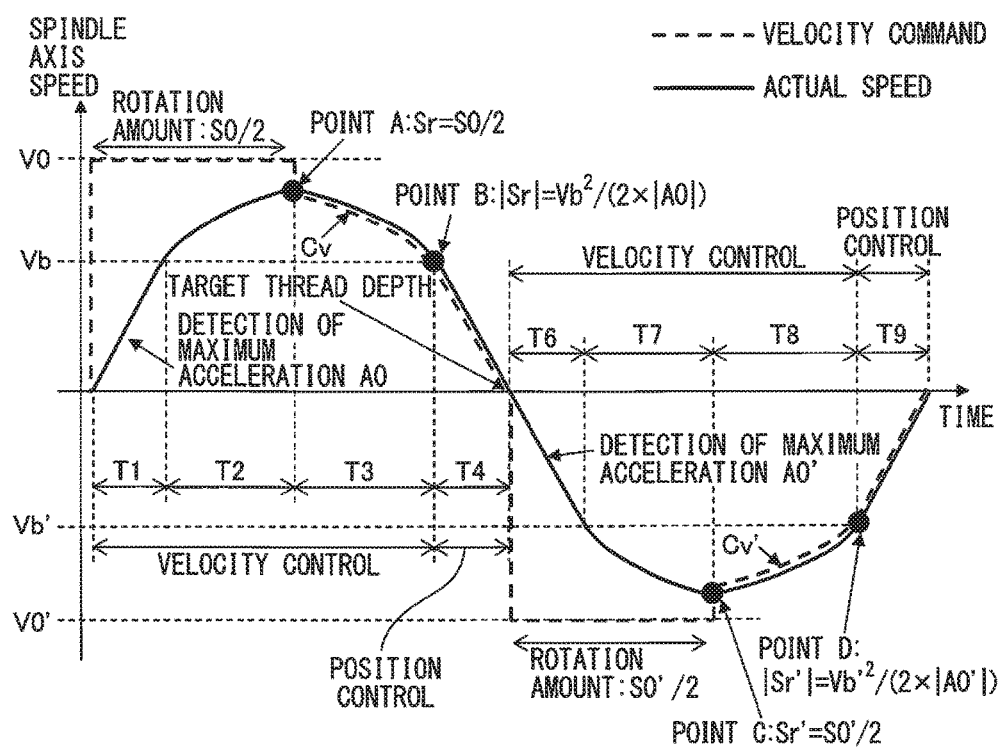
FIG. 5 is a diagram showing one example of the motion of a spindle axis, achieved in the embodiment of FIGS. 1-4.
Figure 6:
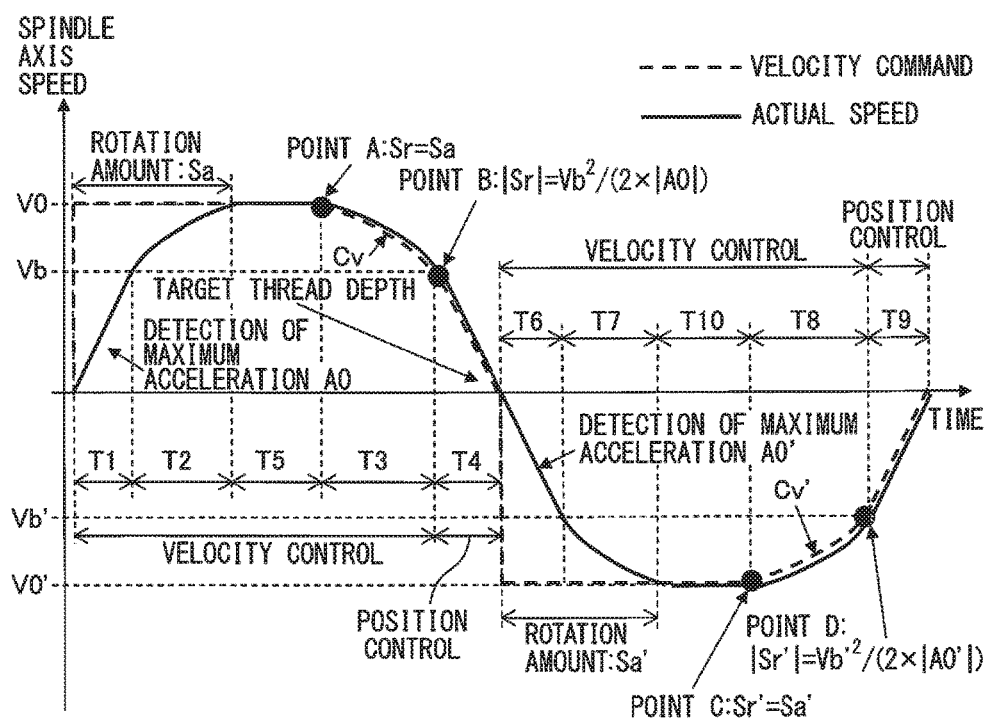
FIG. 6 is a diagram showing another example of the motion of a spindle axis, achieved in the embodiment of FIGS. 1-4.

FIGS. 2 to 4 show the first embodiment of a method of controlling a machine tool, executed by the controller 10. FIGS. 5 and 6 show two different examples of motions of the spindle axis 12, achieved by the control method of FIGS. 2-4. The control method according to the illustrated embodiment may control both of the cutting motion (FIG. 2) and the return motion (FIG. 4) of the spindle axis 12 in the tapping process. For better understanding, the following description uses the terms "total rotation amount", "maximum rotation speed", "accelerated rotation", "residual rotation amount", "current speed", "decelerated rotation", "intermediate speed", "deceleration" and "positioning rotation amount" in relation to the control of the cutting motion, while uses respectively corresponding, substantially synonymous terms "total return-rotation amount", "maximum return-rotation speed", "accelerated inverse rotation", "residual return-rotation amount", "current speed of inverse rotation", "decelerated inverse rotation", "intermediate return-speed", "deceleration of inverse rotation" and "positioning return-rotation amount" in relation to the control of the return motion.

First, a method of controlling the cutting motion of the spindle axis 12, executed by the controller 10, will be described below with reference to a flow chart illustrated in FIGS. 2 and 3 together with FIG. 1. At step S1, the numerical control section 16 (the spindle-axis command outputting section 26) obtains, from a command value provided in the tapping program P interpreted by the program interpreting section 24, the total rotation amount S0 and the maximum rotation speed V0, of the spindle axis 12, during a period when the spindle axis operates from the process start position (or starting position) to the target thread depth (or target position), and instructs the total rotation amount S0 and the maximum rotation speed V0 to the spindle-axis control section 18. At step S2, the spindle-axis control section 18 (the initial-motion control section 30, the maximum-acceleration detecting section 32 and the residual rotation-amount detecting section 34) makes the spindle axis 12 perform the accelerated rotation at maximum capacity using the maximum permissible current of the drive source to perform the cutting motion from the process start position (i.e., zero speed), by a velocity control in which the maximum rotation speed V0 is set as a target speed, detects the maximum acceleration A0 during the accelerated rotation at maximum capacity, and sequentially detects the residual rotation amount Sr from the current position during the accelerated rotation. The spindle-axis control section 18 notifies the detected residual rotation amount Sr to the numerical control section 16 every time it is detected.

Next, at step S3, the spindle-axis control section 18 (the current-speed detecting section 36) sequentially detects the current speed Vc during the accelerated rotation at maximum capacity, and judges whether the current speed Vc has not reached the maximum rotation speed V0 every time it is detected. If "Vc" has not yet reached "V0", the spindle-axis control section 18 (the decelerating-motion control section 38) judges, at step S4, whether the residual rotation amount Sr is equal to or less than one-half of the total rotation amount S0. If "Sr" is equal to or less than one-half of "S0", the spindle-axis control section 18 (the decelerating-motion control section 38) makes, at step S5, the spindle axis 12 perform the decelerated rotation until the intermediate speed Vb, so as to continuously perform the cutting motion. If "Sr" is not equal to or not less than one-half of "S0", the control flow returns to step S3.

Referring now to FIG. 5, one example of the cutting motion of the spindle axis 12, in the case where the residual rotation amount Sr reaches one-half of the total rotation amount S0 before the current speed Vc reaches the maximum rotation speed V0 (i.e., in the case where the judgment results at respective steps S3 and S4 are YES), is depicted by a speed-time curve (the curve above a time axis). The accelerated rotation at maximum capacity of the spindle axis 12 at step S2 is performed during time periods T1 and T2 shown in FIG. 5, and the maximum acceleration A0 is detected during the constant acceleration in the time period T1 (i.e., a time period from a point when the spindle axis starts at the process start position to a point when the spindle axis reaches the intermediate speed Vb). When the rotational speed of the spindle axis 12 exceeds the intermediate speed Vb (the base speed of the spindle motor, in this example), the acceleration of the spindle axis 12 gradually decreases from the maximum acceleration A0 due to the characteristics of the spindle motor. At a time point A when the residual rotation amount Sr reaches one-half of the total rotation amount S0 (i.e., when the rotation amount from the start of processing reaches one-half of the total rotation amount S0) (or when the judgment result at step S4 becomes YES), the motion of the spindle axis 12 changes from the accelerated rotation to the decelerated rotation, and in time period T3, the spindle axis 12 performs the decelerated rotation at step S5. In the time periods T1, T2 and T3, the spindle-axis control section 18 executes a velocity control for the spindle axis 12 (a velocity command in these time periods is illustrated by a broken line).

During the time period T3 (step S5), the spindle-axis control section 18 (the residual rotation-amount detecting section 34 and the current-speed detecting section 36) also sequentially detects the residual rotation amount Sr from the current position and the current speed Vc, of the spindle axis 12. In the time period T3 (step S5), the spindle-axis control section 18 (the decelerating-motion control section 38) executes the velocity control to make the spindle axis 12 perform the decelerated rotation from the point A (or a maximum speed) until the intermediate speed Vb, and in the meantime, successively updates a velocity command Cv for the decelerated rotation with use of the residual rotation amount Sr and the current speed Vc (velocity command Cv is illustrated by a broken line in FIG. 5). More specifically, the decelerating-motion control section 38 successively updates the velocity command Cv, and makes the spindle axis 12 perform the decelerated rotation by the successively updated velocity command Cv so that the residual rotation amount Sr of the spindle axis 12 at an instant when the spindle axis 12 reaches the predetermined intermediate speed Vb becomes equal to a positioning rotation amount Spos of the spindle axis 12 required for the spindle axis to reach the target thread depth under the position control executed by the positioning-motion control section 40.

The positioning rotation amount Spos corresponds to a position of a time point B (FIG. 5), at which it is expected that the residual rotation amount Sr becomes equal to zero and the current speed Vc becomes equal to zero (i.e., the spindle axis reaches the target thread depth) when the positioning-motion control section 40 decelerates the spindle axis 12 from the current speed Vc (hereinafter described as a rotation number per second (unit thereof being represented as rev/s)) at the maximum deceleration A0 (negative value) corresponding to the maximum acceleration A0 (rev/s$^2$) detected at step S2. The positioning rotation amount Spos is determined, as the absolute value of the residual rotation amount Sr (negative value) as seen from the point of Sr=0, by the following equation:

$$|Sr|=Vc^2/(2\times|A0|)=Spos$$

based on a formula: $Vc^2=2\times|A0|\times|Sr|$

In this embodiment, it is premised that the spindle axis 12 is decelerated at the constant maximum deceleration A0 from the point B, in order to facilitate a calculation for the position control from the point B until the target thread depth. Accordingly, it is assumed that the current speed Vc of the spindle axis 12 has reached the intermediate speed Vb at the point B. As a result, the positioning rotation amount Spos can be determined as:

$$Spos=Vb^2/(2\times|A0|)$$

If the residual rotation amount Sr at an instant when the spindle axis 12 reaches the intermediate speed Vb is equal to the positioning rotation amount Spos of the spindle axis 12, the correspondence between the residual rotation amount (i.e., the current position) Sr, the current speed Vc (rev/s) and the current deceleration Ac (rev/s$^2$), of the spindle axis 12 during the time period T3, is represented by the following equation:

$$|Ac|=(Vc^2-Vb^2)/(2\times(Sr-Spos))$$

based on a formula: $Vc^2-Vb^2=2\times|Ac|\times(Sr-Spos)$

In the time period T3 (step S5), the spindle-axis control section 18 (the decelerating-motion control section 38) constantly monitors the residual rotation amount Sr and the current speed Vc of the spindle axis 12, and determines a new or updated velocity command Cv by subtracting a value obtained by multiplying the aforementioned current deceleration Ac by a velocity-command updating cycle Tctl (sec) (i.e., a cycle of preparing the velocity command and notifying it to the spindle axis 12 by the decelerating-motion control section 38) from the current speed Vc (i.e., the last velocity command Cv). The velocity command Cv is represented by the following equation:

$$Cv=Vc-Ac\times Tctl$$

According to the above equation, the decelerating-motion control section 38 successively updates the velocity command Cv in the velocity-command updating cycle Tctl. The spindle axis 12 performs the decelerated rotation while gradually increasing the deceleration Ac in accordance with the successively updated velocity command Cv, during the operation from the point A to the point B, and reaches the point B at an instant when being decelerated to the intermediate speed Vb (FIG. 5).

Turning back to FIG. 2, at step S6, the spindle-axis control section 18 (the positioning-motion control section 40) judges whether the absolute value |Sr| of the residual rotation amount Sr of the spindle axis 12 satisfies the equation: $|Sr|=Vb^2/(2\times|A0|)$ (hereinafter referred to as equation 1) (i.e., whether or not the rotational position of the spindle axis 12 has reached the point B). If the equation 1 is satisfied, the spindle-axis control section 18 (the positioning-motion control section 40) prepares, at step S7, a movement command for making the spindle axis 12 perform the decelerated rotation at the maximum deceleration A0 and reach the point of Sr=0 (i.e., the target thread depth), and executes a position control for the spindle axis 12 with use of the prepared movement command. Also at step S7, the spindle-axis control section 18 (the torque-command limiting section 42) limits a fluctuation of a torque command of the position control to the predetermined range over the predetermined torque-command limiting period at the start of the position control executed by the positioning-motion control section 40. If the equation 1 is not satisfied, the judgment at step S6 is repeated until the equation 1 is satisfied. The spindle axis 12 performs, in accordance with the movement command from the spindle-axis control section 18 (the positioning-motion control section 40), the cutting motion from the point B toward the target thread depth, by performing the decelerated rotation at the maximum deceleration A0, and reaches and stops at the target thread depth when Sr becomes equal to zero. In this way, in the time period T4 (FIG. 3) in which the spindle axis operates from the point B to reach the target thread depth, the spindle-axis control section 18 executes a position control for the spindle axis 12 (a velocity command at a constant acceleration, obtained from the movement command, is shown by a broken line).

The torque command of the position control is determined by the positioning-motion control section 40 by performing a predetermined arithmetic processing relative to the prepared movement command, in a feedback control executed for the spindle axis 12 by the spindle-axis control section 18. In a conventional feedback control, it has been known that a current command is determined from the torque command and the determined current command is given to a spindle motor.

In the position control at step S7, the spindle-axis control section 18 (the positioning-motion control section 40 and the torque-command limiting section 42) executes a position control routine shown in FIG. 3. First, at steps Q1, Q2 and Q3, the torque-command limiting section 42 judges whether a predetermined elapse condition, relating to an elapse from the start of the position control, is satisfied. In the illustrated embodiment, the elapse condition involves a condition where a predetermined time t1 (a minimal time shorter than T4) has elapsed, a condition where the current speed Vc has decreased to a predetermined speed V1 or below, and a condition where the residual rotation amount Sr has decreased to a predetermined rotation amount S1 or below, from the time point B at which the spindle axis 12 reaches the intermediate speed Vb (i.e., the time point of switching from the velocity control to the position control). Therefore, the torque-command limiting section 42 sequentially judges whether the predetermined time t1 has elapsed from the time point B (step Q1), whether the current speed Vc has decreased to the predetermined speed V1 or below from the time point B (step Q2), and whether the residual rotation amount Sr has decreased to the predetermined rotation amount S1 or below from the time point B (step Q3). The order of judgements at steps Q1 to Q3 may be arbitrarily changed. In this connection, the configuration may be adopted, in which at least one of the conditions of the elapse of the predetermined time t1, the decrease of the current speed Vc to the speed V1 or below and the decrease of the residual rotation amount Sr to the rotation amount S1 or below, is used as the elapse condition (i.e., at least one of the judgements at steps Q1 to Q3 is performed). The various elapse conditions may be set by a system designer based on an experimental rule, and may be stored as one of control parameters in a memory (not shown) of the controller 10.

If any elapse condition is not satisfied (i.e., if all of the judgment results at respective steps Q1 to Q3 are NO), the torque-command limiting section 42 sets, at step Q4, a limiting value L used for limiting the fluctuation of the torque command of the position control to the predetermined range. The limiting value L may be set, for example, as a percentage of or an addition/subtraction value to a last torque command Ct. In the case where the illustrated routine is a first processing immediately after the velocity control has been switched to the position control, the last torque command Ct is a last torque command in the velocity control. On the other hand, if the illustrated routine is a processing after the first processing, the last torque command Ct is a last torque command in the position control. The torque-command limiting section 42 may execute a so-called clamp processing for cutting a fluctuation of the torque command, which exceeds the limiting value L, when the positioning-motion control section 40 calculates the torque command. In the case where, for example, the limiting value L is set as a percentage of the last torque command Ct, the torque-command limiting section 42 performs the clamp processing in which the fluctuation of the torque command equal to or less than a value [last torque command Ct×limiting value L (%)] is permitted but the fluctuation of the torque command more than a value [Ct×L (%)] is not permitted, when the positioning-motion control section 40 calculates the torque command, and thereby limits the fluctuation of the torque command to the range defined by the limiting value L.

When the limiting value L has been set, the positioning-motion control section 40 calculates and determines, at step Q5, the movement command based on the sequentially detected residual rotation amount Sr, calculates and determines, at step Q6, the velocity command on the basis of the movement command, and calculates and determines, at step Q7, the torque command on the basis of the velocity command. At step Q7, the torque-command limiting section 42 applies the limiting value L to the torque command determined by the positioning-motion control section 40 over the predetermined torque-command limiting period, in a manner as described above, so as to limit the range of fluctuation of the torque command. After the torque command is determined, the positioning-motion control section 40 judges, at step Q8, whether or not the spindle axis 12 has reached the target position (or target thread depth) based on the sequentially detected residual rotation amount Sr. If the spindle axis 12 has reached the target thread depth, the position control routine is finished. If the spindle axis 12 has not reached the target thread depth, the control flow returns to step Q1 and the position control routine is repeated.

If any one of the elapse conditions is satisfied at steps Q1 to Q3, the torque-command limiting section 42 releases, at step Q9, the previously set limiting value L. Then, at steps Q5 to Q7, the positioning-motion control section 40 sequentially determines the movement command, the velocity command and the torque command. At step Q7, a procedure for limiting the fluctuation of the torque command determined by the positioning-motion control section 40 is not performed since the limiting value L has been released. After the torque command is determined, the positioning-motion control section 40 judges, at step Q8, whether or not the spindle axis 12 has reached the target position (or target thread depth). In this way, the torque-command limiting section 42 limits the fluctuation of the torque command of the position control, instructed from the positioning-motion control section 40 to the spindle axis 12, to the range defined by the limiting value L, over the time period until any one of the elapse conditions, i.e., the elapse of the time t1, the decrease of the current speed Vc to the speed V1 or below and the decrease of the residual rotation amount Sr to the rotation amount S1 or below, is satisfied.

Figure 7A:
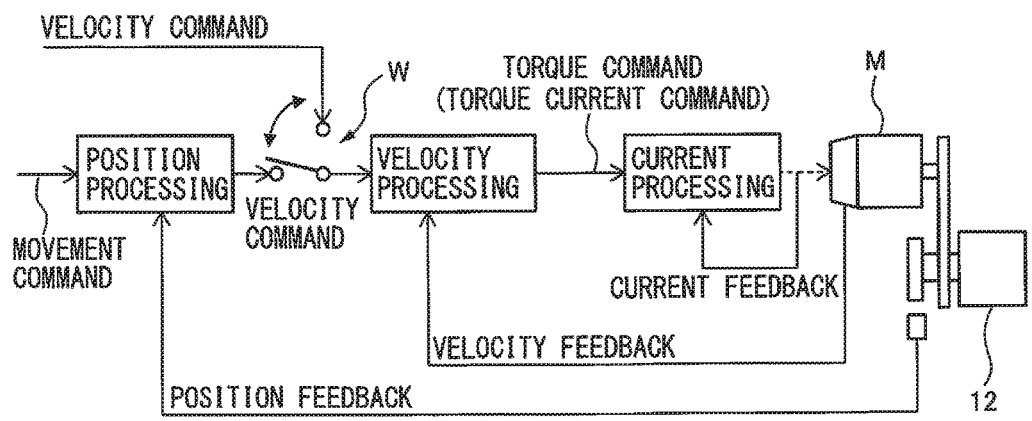
FIG. 7A is a block diagram showing a flow of a control executed in the embodiment of FIGS. 1-4.
Figure 7B:
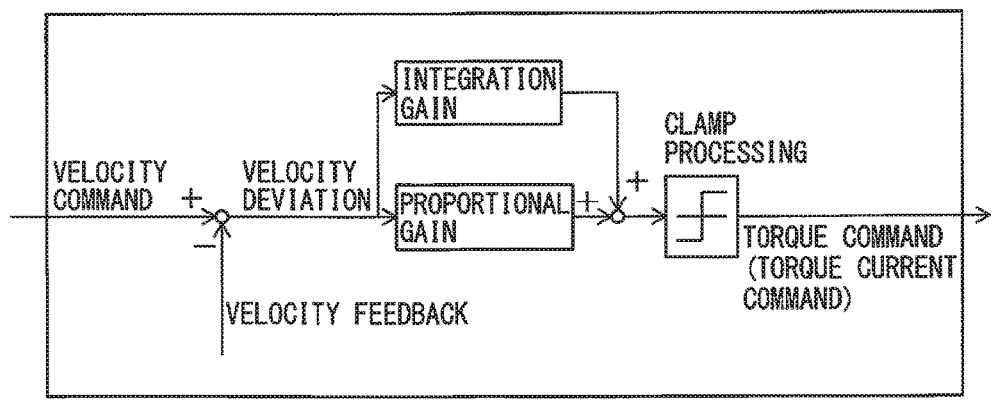
FIG. 7B is a diagram showing the detail of a velocity processing block in the block diagram of FIG. 7A.

FIG. 7A shows, by a block diagram, one example of the aforementioned position control routine. FIG. 7B shows the detail of a velocity processing block in the block diagram. In the position control routine shown in FIG. 7A, a velocity command is determined by a position processing block based on a deviation between a movement command and a position feedback (i.e., rotational position FBS), a torque command (or torque current command) is determined by a velocity processing block based on a deviation between the velocity command and a velocity feedback, a current command is determined by a current processing block based on a deviation between the torque command and a current feedback, and the determined current command is given to a spindle motor M. In the velocity processing block, as shown in FIG. 7B, the velocity command is multiplied by a proportional gain and an integration gain, and the respective products are added to each other, and thereafter, the clamp processing is performed over the predetermined torque-command limiting period so as to determine the torque command (or the torque current command).

Figure 8A:
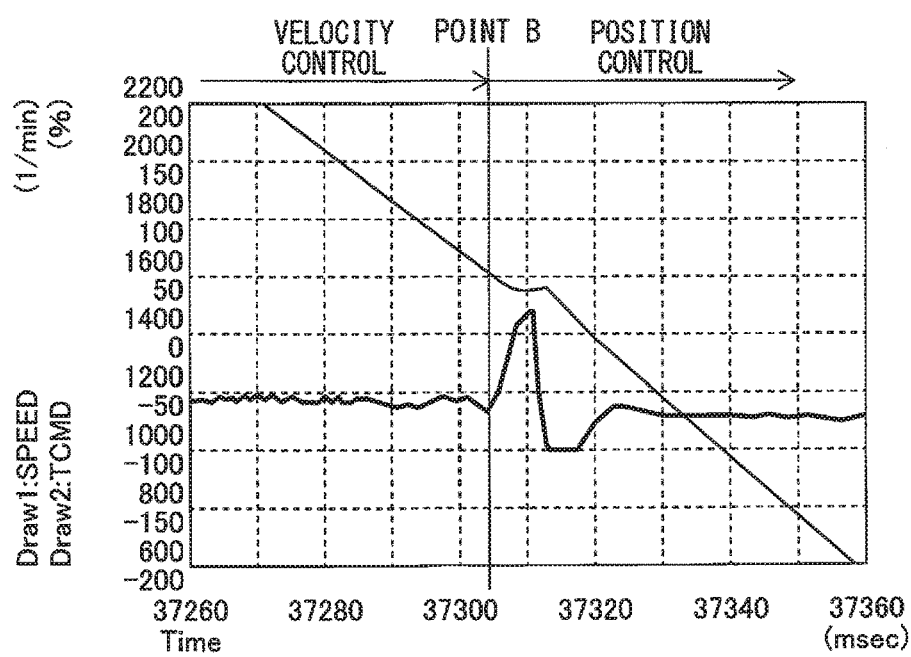
FIG. 8A is a diagram showing a part of the motion of a spindle axis, shown in FIG. 5 or FIG. 6, together with a torque command corresponding thereto, which is not subjected to a torque-command limiting procedure.
Figure 8B:
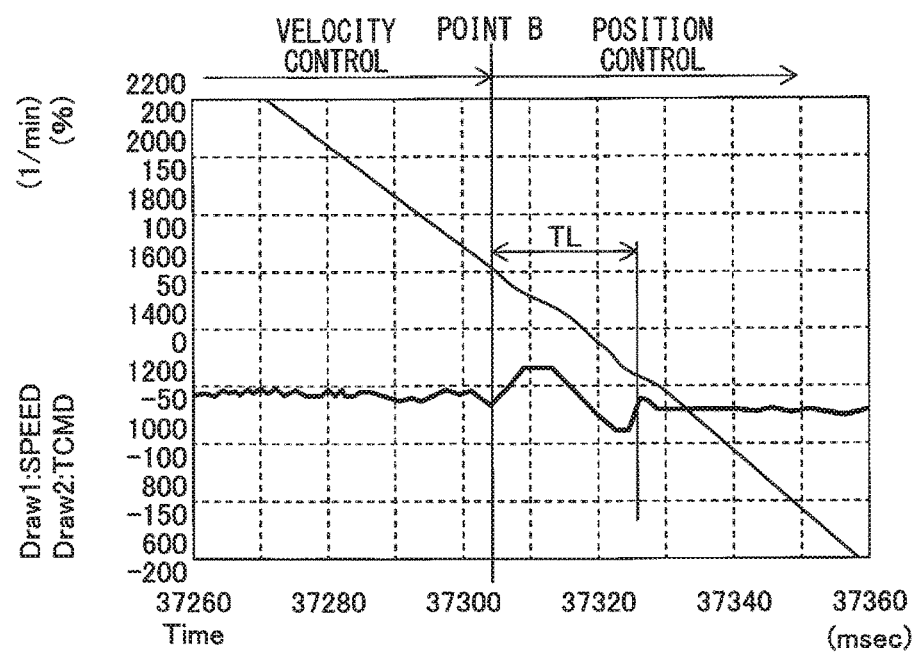
FIG. 8B is a diagram showing a part of the motion of a spindle axis, shown in FIG. 5 or FIG. 6, together with a torque command corresponding thereto, which has been subjected to a torque-command limiting procedure.

FIGS. 8A and 8B show in an enlarged manner an area around the point B in the speed-time curve of FIG. 5, and depict a part of the speed-time curve (thin line) in an arbitral time period according to one example and a torque command (thick line) corresponding to the motion of the spindle axis 12 in the same time period. FIG. 8A shows a configuration wherein the velocity control is switched to the position control at the point B to make the spindle axis 12 perform the decelerated rotation without the execution of steps Q1 to Q4 and Q9 in the aforementioned position control routine. On the other hand, FIG. 8B shows a configuration wherein the velocity control is switched to the position control at the point B to make the spindle axis 12 perform the decelerated rotation with the execution of the aforementioned position control routine (steps Q1 to Q9). In the example shown in FIG. 8A, an approximately constant acceleration (or deceleration) of the spindle axis 12 during the velocity control significantly changes immediately after the point B at which the velocity control is switched to the position control, so that the motion of the spindle axis 12 shifts to a constant-speed rotation or an accelerated rotation, and thereafter the spindle axis 12 performs again the decelerated rotation at an approximately constant acceleration. A torque command corresponding to the illustrated motion of the spindle axis 12 also significantly varies immediately after the point B. Note that, in this example, the torque command is represented as a percentage (%) of a torque (100%) corresponding to a maximum power of the spindle motor.

On the other hand, in the example shown in FIG. 8B, the limit processing (or clamp processing) for the fluctuation of the torque command is performed as described above in the predetermined torque-command limiting period TL immediately after the point B at which the velocity control is switched to the position control, and consequently, a torque command during the torque-command limiting period TL comes close to a torque command in the velocity control immediately before the period TL and also to a torque command in the position control immediately after the period TL. In this example, the limiting value L used in the clamp processing may be set as, for example, 20% to 30% of the last torque command Ct. The spindle axis 12 performs a smoothly decelerated rotation in accordance with the resultant approximately constant torque command, without substantially changing the acceleration before and after the point B. Consequently, a mechanical or structural shock that may be caused on the spindle axis 12 due to the change in acceleration is reduced, and a synchronization error that may be caused between the spindle axis 12 and the feed axis 14 due to the change in acceleration is reduced.

Turning back to FIG. 2, if the spindle-axis control section 18 (the current-speed detecting section 36) judges, at step S3, that the current speed Vc has reached the maximum rotation speed V0, the spindle-axis control section 18 stores, at step S8, a rotation amount (i.e., a rotational position FBS) of the spindle axis 12 from the process start position at an instant when the spindle axis reaches the maximum rotation speed V0, as an acceleration rotation amount Sa. Then, at step S9, the spindle-axis control section 18 judges whether the residual rotation amount Sr is equal to or less than the acceleration rotation amount Sa. If "Sr" is equal to or less than "Sa", the control flow goes to step S5, and subsequently executes steps S6 and S7, so as to perform the cutting motion until the target thread depth. If "Sr" is not equal to or not less than "Sa", the judgment at step S9 is repeated until "Sr" becomes equal to or less than "Sa".

Referring now to FIG. 6, one example of the cutting motion of the spindle axis 12, in the case where the current speed Vc reaches the maximum rotation speed V0 before the residual rotation amount Sr reaches one-half of the total rotation amount S0 (i.e., in the case where the judgment result at step S3 is No), is depicted by a speed-time curve (the curve above a time axis). As shown in FIG. 6, the accelerated rotation of the spindle axis 12 at maximum capacity at step S2 is performed during time periods T1 and T2, and the maximum acceleration A0 is detected during the constant acceleration in the time period T1 (i.e., a time period from a point when the spindle axis starts at the process start position to a point when the spindle axis reaches the intermediate speed Vb). When the rotational speed of the spindle axis 12 exceeds the intermediate speed Vb (the base speed of the spindle motor, in this example), the acceleration of the spindle axis 12 gradually decreases from the maximum acceleration A0 due to the characteristics of the spindle motor. The current speed Vc of the spindle axis 12 reaches the maximum rotation speed V0 before the residual rotation amount Sr reaches one-half of the total rotation amount S0. Thereafter, the spindle axis 12 rotates at the constant speed V0 (i.e., null acceleration) over time period T5 so as to continue the cutting motion. At a time point A when the residual rotation amount Sr becomes equal to the acceleration rotation amount Sa (i.e., when the judgment result at step S9 becomes YES), the motion of the spindle axis 12 changes from the accelerated rotation to the decelerated rotation. Then, in time period T3 (step S5), the spindle axis 12 performs the aforementioned decelerated rotation while gradually increasing the deceleration Ac (by the velocity control), and in time period T4 (step S7), the spindle axis 12 performs the decelerated rotation at the maximum deceleration A0 in accordance with the position control routine shown in FIG. 3. The spindle axis 12 reaches and stops at the target thread depth when "Sr" becomes equal to zero. In the time periods T1, T2, T3 and T4, the spindle axis 12 operates in the same manner as the motion shown in FIG. 5.

In the motion examples shown in FIGS. 5 and 6, during a period when the spindle-axis control section 18 controls the rotational (or cutting) motion of the spindle axis 12 from the process start position to the target thread depth, the feed-axis control section 22 (FIG. 1) executes a feedback control for the feed axis 14 so as to make the feed axis perform a feed motion while following the motion of the spindle axis 12, with use of the rotational position FBS of the spindle axis 12. During a period when the spindle-axis control section 18 executes the processes from step S1 to step S9, the numerical control section 16 monitors the residual rotation amount Sr notified from the spindle-axis control section 18, and judges that the tapping process has reached the target thread depth when the residual rotation amount Sr becomes equal to or less than a first predetermined value (a very small value close to zero).

As described above, the controller 10 has a configuration wherein, when the spindle axis 12 performs the cutting motion (rotational motion) from the process start position (starting position) to the target thread depth (target position), the numerical control section 16 instructs only the total rotation amount S0 and the maximum rotation speed V0, of the spindle axis 12, as the spindle axis command CS to the spindle-axis control section 18, and the spindle-axis control section 18 performs, in accordance with the spindle axis command CS, the cutting motion by accelerating the spindle axis 12 with the maximum power using the maximum permissible current, aiming at the maximum rotation speed V0, and continuously performs, based on the sequentially detected residual rotation amount Sr and current speed Vc of the spindle axis 12, the cutting motion until the target thread depth while decelerating the spindle axis 12 at the maximum deceleration A0 so as to make the spindle axis reach the target thread depth. Therefore, according to the controller 10, it is no longer necessary to perform a parameter setting or adjustment, etc., required for the numerical control section 16 to prepare acceleration and deceleration commands in conformity with the power characteristics of the spindle axis 12, and it is possible, with a simple configuration, to reduce the cycle time of the tapping process by executing an acceleration and deceleration control so as to maximize the acceleration capacity of the spindle axis 12.

Further, the controller 10 has a configuration wherein, during the decelerated rotation of the spindle axis 12, the spindle-axis control section 18 (the torque-command limiting section 42) limits the range of fluctuation of a torque command of the position control, which is instructed to the spindle axis 12, to a predetermined range over a predetermined torque-command limiting period immediately after the point B where the current speed Vc reaches the intermediate speed Vb and the velocity control is switched to the position control. When the fluctuation of the torque command is limited over the predetermined time period after reaching the intermediate speed Vb and thereby the torque command is brought close to a constant value, it becomes possible to bring the acceleration of the spindle axis 12 in the same period close to a constant value. Consequently, according to the controller 10, a change in the acceleration of the spindle axis 12 immediately after the velocity control is switched to the position control during the decelerated rotation of the spindle axis 12 is able to be suppressed, and therefore, it is possible to reduce a mechanical or structural shock that may be caused on the spindle axis 12 due to the change in acceleration, and to reduce a synchronization error that may be caused between the spindle axis 12 and the feed axis 14 due to the change in acceleration.

In the embodiment shown in FIGS. 1 and 2, the controller 10 is capable of executing, in relation to the aforementioned return motion of the spindle axis 12, a control strategy analogous to the aforementioned control strategy for the cutting motion from the process start position to the target thread depth. FIGS. 5 and 6 show one example of the return motion of the spindle axis 12, corresponding to the aforementioned cutting motion of the spindle axis 12, by a speed-time curve (the curve below a time axis), in addition to the cutting motion. With reference to FIGS. 3 to 6 together with FIG. 1, a method of controlling the return motion of the spindle axis 12, executed by the controller 10, will be described below. Note that, for a better understanding, a reference numeral or symbol used in the following explanation is provided with a prime (') that is added to a corresponding reference numeral or symbol used in the explanation of the cutting motion control method.

First, referring to a flowchart illustrated in FIG. 4, after it is judged that the tapping process has reached the target thread depth in the cutting motion control flow of FIG. 2, the numerical control section 16 (the spindle-axis command outputting section 26) obtains, at step S10, a total return-rotation amount S0' and a maximum return-rotation speed V0', of the spindle axis 12, during a period when the spindle axis operates from the target thread depth (or starting position) to the return completion position (or target position), from a command value provided in the tapping program P interpreted by the program interpreting section 24, and sends the total return-rotation amount S0' and the maximum return-rotation speed V0' as a spindle-axis command CS to the spindle-axis control section 18. The spindle-axis command CS for the return motion also does not include a position command (or movement command) and/or an acceleration/deceleration command, which makes the spindle axis 12 perform a rotational motion until the return completion position. Note that the return completion position may be the same as the process start position, or may be different from the process start position. In the case where the return completion position coincides with the process start position, the total return-rotation amount S0' is equal to the total rotation amount S0 in the cutting motion, but the maximum return-rotation speed V0' is not always equal to the maximum rotation speed V0 in the cutting motion. Also, if the total return-rotation amount S0' and the maximum return-rotation speed V0' are equal to the total rotation amount S0 and the maximum rotation speed V0 in the cutting motion, the return motion is depicted by the substantially same speed-time curve as that of the cutting motion, but if the total return-rotation amount S0' and the maximum return-rotation speed V0' are different from the total rotation amount S0 and the maximum rotation speed V0 in the cutting motion, the return motion is not always depicted by the same speed-time curve as that of the cutting motion.

Next, at step S11, the spindle-axis control section 18 (the initial-motion control section 30, the maximum-acceleration detecting section 32 and the residual rotation-amount detecting section 34) executes the following processes. The initial-motion control section 30 makes the spindle axis 12 perform an accelerated inverse rotation at maximum capacity using the maximum permissible current of the drive source from the target thread depth (i.e., zero speed), by a velocity control in which the maximum return-rotation speed V0' is set as a target value, so as to perform the return motion. The maximum-acceleration detecting section 32 detects a maximum acceleration A0' of inverse rotation of the spindle axis 12, during the accelerated inverse rotation at maximum capacity from the target thread depth, based on the rotational position FBS. The residual rotation-amount detecting section 34 sequentially detects a residual return-rotation amount Sr' of the spindle axis 12 from a current position during the accelerated inverse rotation, based on the total return-rotation amount S0' and the rotational position FBS. The spindle-axis control section 18 notifies the detected residual return-rotation amount Sr' to the numerical control section 16 every time it is detected.

Next, at step S12, the spindle-axis control section 18 (the current-speed detecting section 36) sequentially detects a current speed Vc' of inverse rotation of the spindle axis 12, based on the rotational position FBS during the accelerated inverse rotation at maximum capacity, and judges whether the current speed Vc' has not reached the maximum return-rotation speed V0' every time it is detected. If "Vc'" has not reached "V0'", the spindle-axis control section 18 (the decelerating-motion control section 38) judges, at step S13, whether the residual return-rotation amount Sr' is equal to or less than one-half of the total return-rotation amount S0'. If "Sr'" is equal to or less than one-half of "S0'", the spindle-axis control section 18 (the decelerating-motion control section 38) makes, at step S14, the spindle axis 12 perform a decelerated inverse rotation until the intermediate return-speed Vb', so as to continuously perform the return motion. If "Sr'" is not equal to or not less than one-half of "S0'", the control flow returns to step S12.

Referring now to FIG. 5, one example of the return motion of the spindle axis 12, in the case where the residual return-rotation amount Sr' reaches one-half of the total return-rotation amount S0' before the current speed Vc' of inverse rotation reaches the maximum return-rotation speed V0' (i.e., in the case where the judgment results at respective steps S12 and S13 are YES), is depicted by a speed-time curve (the curve below a time axis). The accelerated inverse rotation at maximum capacity of the spindle axis 12 at step S11 is performed during time periods T6 and T7 shown in FIG. 5, and the maximum acceleration A0' of inverse rotation is detected during the constant acceleration in the time period T6 (i.e., a time period from a point when the spindle axis starts at the target thread depth to a point when the spindle axis reaches the intermediate return-speed Vb'). When the rotational speed of the spindle axis 12 exceeds the intermediate return-speed Vb' (the base speed of the spindle motor, in this example), the acceleration of the spindle axis 12 gradually decreases from the maximum acceleration A0' due to the characteristics of the spindle motor. At a time point C when the residual return-rotation amount Sr' reaches one-half of the total return-rotation amount S0' (i.e., when the rotation amount from the start of returning reaches one-half of the total return-rotation amount S0') (or when the judgment result at step S13 becomes YES), the motion of the spindle axis 12 changes from the accelerated inverse rotation to the decelerated inverse rotation, and in time period T8, the spindle axis 12 performs the decelerated inverse rotation at step S14. In the time periods T6, T7 and T8, the spindle-axis control section 18 executes a velocity control for the spindle axis 12 (a velocity command in these time periods is illustrated by a broken line).

During the time period T8 (step S14), the spindle-axis control section 18 (the residual rotation-amount detecting section 34 and the current-speed detecting section 36) also sequentially detects the residual return-rotation amount Sr' from the current position and the current speed Vc' of inverse rotation, of the spindle axis 12. In the time period T8 (step S14), the spindle-axis control section 18 (the decelerating-motion control section 38) executes the velocity control to make the spindle axis 12 perform the decelerated inverse rotation from the point C (or a maximum speed of inverse rotation) until the intermediate return-speed Vb', and in the meantime, successively updates a velocity command Cv' for the decelerated inverse rotation with use of the residual return-rotation amount Sr' and the current speed Vc' of inverse rotation (velocity command Cv' is illustrated by a broken line in FIG. 5). More specifically, the decelerating-motion control section 38 successively updates the velocity command Cv', and makes the spindle axis 12 perform the decelerated inverse rotation by the successively updated velocity command Cv' so that the residual return-rotation amount Sr' of the spindle axis 12 at an instant when the spindle axis 12 reaches the predetermined intermediate return-speed Vb' becomes equal to a positioning return-rotation amount Spos' of the spindle axis 12 required for the spindle axis to stop at the return completion position under the position control executed by the positioning-motion control section 40.

The positioning return-rotation amount Spos' corresponds to a position of a time point D (FIG. 5), at which it is expected that the residual return-rotation amount Sr' becomes equal to zero and the current speed Vc' of inverse rotation becomes equal to zero (i.e., the spindle axis reaches the return completion position) when the positioning-motion control section 40 decelerates the spindle axis 12 from the current speed Vc' of inverse rotation (hereinafter described as a rotation number per second (unit thereof being represented as rev/s)) at the maximum deceleration A0' of inverse rotation (negative value) corresponding to the maximum acceleration A0' of inverse rotation (rev/s$^2$) detected at step S11. The positioning return-rotation amount Spos' is determined, analogously to the aforementioned positioning rotation amount Spos, by the following equation:

$$Spos'=Vb'^2/(2\times|A0'|)$$

In this embodiment, it is premised that the spindle axis 12 is decelerated at the constant maximum deceleration A0' from the point D, in order to facilitate a calculation for the position control from the point D until the return completion position. Accordingly, it is assumed that the current speed Vc' of the spindle axis 12 has reached the intermediate return-speed Vb' at the point D.

If the residual return-rotation amount Sr' at an instant when the spindle axis 12 reaches the intermediate return-speed Vb' is equal to the positioning return-rotation amount Spos' of the spindle axis 12, the correspondence between the residual return-rotation amount (i.e., the current position) Sr', the current speed Vc' (rev/s) and the current deceleration Ac' (rev/s$^2$), of the spindle axis 12 during the time period T8, is represented by the following equation:

$$|Ac'|=(Vc'^2-Vb'^2)/(2\times(Sr'-Spos'))$$

based on a formula: $Vc'^2-Vb'^2=2\times|Ac'|\times(Sr'-Spos')$

In the time period T8 (step S14), the spindle-axis control section 18 (the decelerating-motion control section 38) constantly monitors the residual return-rotation amount Sr' and the current speed Vc' of inverse rotation of the spindle axis 12, and determines a new or updated velocity command Cv' by subtracting a value obtained by multiplying the aforementioned current deceleration Ac' by a velocity-command updating cycle Tctl (sec) from the current speed Vc' (i.e., the last velocity command Cv'). The velocity command Cv' is represented by the following equation:

$$Cv'=Vc'-Ac'\times Tctl$$

According to the above equation, the decelerating-motion control section 38 successively updates the velocity command Cv' in the velocity-command updating cycle Tctl. The spindle axis 12 performs the decelerated inverse rotation while gradually increasing the deceleration Ac' in accordance with the successively updated velocity command Cv', during the operation from the point C to the point D, and reaches the point D at an instant when being decelerated to the intermediate return-speed Vb' (FIG. 5).

Turning back to FIG. 4, at step S15, the spindle-axis control section 18 (the positioning-motion control section 40) judges whether the absolute value |Sr'| of the residual return-rotation amount Sr' of the spindle axis 12 satisfies the equation: $|Sr'|=Vb'^2/(2|\times A0'|)$ (hereinafter referred to as equation 2) (i.e., whether or not the rotational position of the spindle axis 12 has reached the point D). If the equation 2 is satisfied, the spindle-axis control section 18 (the positioning-motion control section 40) prepares, at step S16, a movement command for making the spindle axis 12 perform the decelerated inverse rotation at the maximum deceleration A0' and stop at the point of Sr'=0 (i.e., the return completion position), and executes a position control for the spindle axis 12 with use of the prepared movement command. Also at step S16, the spindle-axis control section 18 (the torque-command limiting section 42) limits the range of fluctuation of a torque command of the position control to the predetermined range over the predetermined torque-command limiting period at the start of the position control executed by the positioning-motion control section 40. If the equation 2 is not satisfied, the judgment at step S15 is repeated until the equation 2 is satisfied. The spindle axis 12 performs, in accordance with the movement command from the spindle-axis control section 18 (the positioning-motion control section 40), the return motion from the point D toward the return completion position, by performing the decelerated inverse rotation at the maximum deceleration A0', and reaches and stops at the return completion position when Sr' becomes equal to zero. In this way, in the time period T9 (FIG. 5) in which the spindle axis operates from the point D to reach the return completion position, the spindle-axis control section 18 executes a position control for the spindle axis 12 (a velocity command at a constant acceleration, obtained from the movement command, is shown by a broken line).

In the position control at step S16, the spindle-axis control section 18 (the positioning-motion control section 40 and the torque-command limiting section 42) executes a position control routine shown in FIG. 3, in a manner analogous to the aforementioned position control at step S7. In summary, at steps Q1, Q2 and Q3, the torque-command limiting section 42 judges whether elapse conditions of the return motion, respectively corresponding to the aforementioned elapse conditions of the cutting motion, is satisfied, which relates to an elapse from the time point D at which the spindle axis 12 reaches the intermediate return-speed Vb' (i.e., the time point of switching from the velocity control to the position control). If any elapse condition is not satisfied (i.e., if all of the judgment results at respective steps Q1 to Q3 are NO), the torque-command limiting section 42 sets, at step Q4, a limiting value L used for limiting the fluctuation of the torque command of the position control to the predetermined range. Next, the positioning-motion control section 40 calculates and determines, at step Q5, the movement command based on the sequentially detected residual return-rotation amount Sr', calculates and determines, at step Q6, the velocity command on the basis of the movement command, and calculates and determines, at step Q7, the torque command on the basis of the velocity command. At step Q7, the torque-command limiting section 42 applies the limiting value L to the torque command determined by the positioning-motion control section 40 over the predetermined torque-command limiting period, in a manner as described above, so as to limit the range of fluctuation of the torque command. Next, the positioning-motion control section 40 judges, at step Q8, whether or not the spindle axis 12 has reached the target position (or return completion position) based on the sequentially detected residual return-rotation amount Sr'. If the spindle axis 12 has reached the return completion position, the position control routine is finished. If the spindle axis 12 has not reached the return completion position, the control flow returns to step Q1 and the position control routine is repeated.

If any one of the elapse conditions is satisfied at steps Q1 to Q3, the torque-command limiting section 42 releases, at step Q9, the previously set limiting value L. Then, at steps Q5 to Q7, the positioning-motion control section 40 sequentially determines the movement command, the velocity command and the torque command, and judges, at step Q8, whether or not the spindle axis 12 has reached the target position (or return completion position). At step Q7, a procedure for limiting the fluctuation of the torque command determined by the positioning-motion control section 40 is not performed since the limiting value L has been released. In this way, the torque-command limiting section 42 limits the fluctuation of the torque command of the position control, instructed from the positioning-motion control section 40 to the spindle axis 12, to the range defined by the limiting value L, over the time period until any one of the elapse conditions, i.e., the elapse of the time t1, the decrease of the current speed Vc' of inverse rotation to the speed V1 or below and the decrease of the residual return-rotation amount Sr' to the rotation amount S1 or below, is satisfied.

Turning back to FIG. 4, if the spindle-axis control section 18 (the current-speed detecting section 36) judges, at step S12, that the current speed Vc' of inverse rotation has reached the maximum return-rotation speed V0', the spindle-axis control section 18 stores, at step S17, a rotation amount of the spindle axis 12 from the target thread depth (i.e., a rotational position FBS) at an instant when the spindle axis reaches the maximum return-rotation speed V0', as an acceleration rotation amount Sa' of the return motion. Then, at step S18, the spindle-axis control section 18 judges whether the residual return-rotation amount Sr' is equal to or less than the acceleration rotation amount Sa'. If "Sr'" is equal to or less than "Sa'", the control flow goes to step S14, and subsequently executes steps S15 and S16, so as to perform the return motion until the return completion position. If "Sr'" is not equal to or not less than "Sa'", the judgment at step S18 is repeated until "Sr'" becomes equal to or less than "Sa'".

Referring now to FIG. 6, one example of the return motion of the spindle axis 12, in the case where the current speed Vc' of inverse rotation reaches the maximum return-rotation speed V0' before the residual return-rotation amount Sr' reaches one-half of the total return-rotation amount S0' (i.e., in the case where the judgment result at step S12 is No), is depicted by a speed-time curve (the curve below a time axis). As shown in FIG. 6, the accelerated inverse rotation of the spindle axis 12 at maximum capacity at step S11 is performed during time periods T6 and T7, and the maximum acceleration A0' of inverse rotation is detected during a constant acceleration in time period T6 (i.e., a time period from a point when the spindle axis starts at the target thread depth to a point when the spindle axis reaches the intermediate return-speed Vb'). When the rotational speed of the spindle axis 12 exceeds the intermediate return-speed Vb' (the base speed of the spindle motor, in this example), the acceleration of the spindle axis 12 gradually decreases from the maximum acceleration A0' due to the characteristics of the spindle motor. The current speed Vc' of the spindle axis 12 reaches the maximum return-rotation speed V0' before the residual return-rotation amount Sr' reaches one-half of the total return-rotation amount S0', and thereafter, the spindle axis 12 inversely rotates at the constant speed V0' (i.e., null acceleration) over time period T10 so as to continue the return motion. At a time point C when the residual return-rotation amount Sr' becomes equal to the acceleration rotation amount Sa' (i.e., when the judgment result at step S18 becomes YES), the motion of the spindle axis 12 changes from the accelerated inverse rotation to the decelerated inverse rotation. Then, in time period T8 (step S14), the spindle axis 12 performs the aforementioned decelerated inverse rotation while gradually increasing the deceleration Ac' (by the velocity control), and in time period T9 (step S16), the spindle axis 12 performs the decelerated inverse rotation at the maximum deceleration A0 in accordance with the position control routine shown in FIG. 3. The spindle axis 12 reaches and stops at the return completion position when "Sr'" becomes equal to zero. In the time periods T6, T7, T8 and T9, the spindle axis 12 operates in the same manner as the motion shown in FIG. 5.

In the motion examples shown in FIGS. 5 and 6, during a period when the spindle-axis control section 18 controls the inverse rotational (or return) motion of the spindle axis 12 from the target thread depth to the return completion position, the feed-axis control section 22 (FIG. 1) executes a feedback control for the feed axis 14 so as to make the feed axis perform an inverse feed motion while following the motion of the spindle axis 12, with use of the rotational position FBS of the spindle axis 12. During a period when the spindle-axis control section 18 executes the processes from step S10 to step S18, the numerical control section 16 monitors the residual return-rotation amount Sr' notified from the spindle-axis control section 18, and judges that the return motion is completed and the tool has been pulled out from the workpiece when the residual return-rotation amount Sr' becomes equal to or less than a second predetermined value (a very small value close to zero).

As described above, the controller 10 has a configuration wherein, when the spindle axis 12 performs the return motion (rotational motion) from the target thread depth (starting position) to the return completion position (target position), the numerical control section 16 instructs only the total return-rotation amount S0' and the maximum return-rotation speed V0', of the spindle axis 12, as the spindle axis command CS to the spindle-axis control section 18, and the spindle-axis control section 18 performs, in accordance with the spindle axis command CS, the return motion by inversely accelerating the spindle axis 12 with the maximum power using the maximum permissible current, aiming at the maximum return-rotation speed V0', and continuously performs, based on the sequentially detected residual return-rotation amount Sr' and current speed Vc' of the spindle axis 12, the return motion until the return completion position while inversely decelerating the spindle axis 12 at the maximum deceleration A0' so as to make the spindle axis reach the return complete position. Therefore, according to the controller 10, it is no longer necessary to perform a parameter setting or adjustment, etc., required for the numerical control section 16 to prepare acceleration and deceleration commands in conformity with the power characteristics of the spindle axis 12, and it is possible, with a simple configuration, to reduce the cycle time of the tapping process by executing an acceleration and deceleration control so as to maximize the acceleration capacity of the spindle axis 12.

Further, the controller 10 has a configuration wherein, during the decelerated inverse rotation of the spindle axis 12, the spindle-axis control section 18 (the torque-command limiting section 42) limits the range of fluctuation of a torque command of the position control, which is instructed to the spindle axis 12, to a predetermined range over a predetermined torque-command limiting period immediately after the point D where the current speed Vc' reaches the intermediate return-speed Vb' and the velocity control is switched to the position control. When the fluctuation of the torque command is limited over the predetermined time period after the intermediate return-speed Vb' is reached and thereby the torque command is brought close to a constant value, it becomes possible to bring the acceleration of the spindle axis 12 in the same period close to a constant value. Consequently, according to the controller 10, a change in the acceleration of the spindle axis 12 immediately after the velocity control is switched to the position control during the decelerated inverse rotation of the spindle axis 12 is able to be suppressed, and therefore, it is possible to reduce a mechanical or structural shock that may be caused on the spindle axis 12 due to the change in acceleration, and to reduce a synchronization error that may be caused between the spindle axis 12 and the feed axis 14 due to the change in acceleration.

The above-described configuration of the controller 10 can be described as a machine tool control method for controlling a synchronized operation of the spindle axis 12 and the feed axis 14. The control method includes the steps, executed by the controller 10, of:

obtaining, from a tapping program P, a total rotation amount S0 (or a total return-rotation amount S0') and a maximum rotation speed V0 (or a maximum return-rotation speed V0') of the spindle axis 12 during a period when the spindle axis operates from a starting position to a target position;

making the spindle axis 12 perform an accelerated rotation (or an accelerated inverse rotation) at maximum capacity from the starting position, by a velocity control in which the maximum rotation speed V0 (or the maximum return-rotation speed V0') is set as a target value;

detecting a maximum acceleration A0 (or a maximum acceleration A0' of inverse rotation) of the spindle axis 12 during the accelerated rotation (or the accelerated inverse rotation) at maximum capacity, based on a rotational position feedback FBS of the spindle axis 12;

detecting a residual rotation amount Sr (or a residual return-rotation amount Sr') of the spindle axis 12 during a period when the spindle axis operates from a current position to the target position, based on the total rotation amount S0 (or the total return-rotation amount S0') and the rotational position feedback FBS;

detecting a current speed Vc (or a current speed Vc' of inverse rotation) of the spindle axis 12 based on the rotational position feedback FBS;

executing a velocity control for making the spindle axis 12 perform a decelerated rotation (or a decelerated inverse rotation) so as to reach a predetermined intermediate speed Vb (or a predetermined intermediate return-speed Vb'), after the accelerated rotation (or the accelerated inverse rotation) at maximum capacity;

executing a position control for making the spindle axis 12 perform a decelerated rotation (or a decelerated inverse rotation) at a maximum deceleration A0 (or a maximum deceleration A0' of inverse rotation) corresponding to the maximum acceleration A0 (or the maximum acceleration A0' of inverse rotation) so as to reach the target position, based on the residual rotation amount Sr (or the residual return-rotation amount Sr') and the current speed Vc (or the current speed Vc' of inverse rotation), after the spindle axis 12 reaches the intermediate speed Vb (or the intermediate return-speed Vb'); and limiting a fluctuation of a torque command of the position control, instructed to the spindle axis 12, to a predetermined range over a time period from a point when the spindle axis 12 reaches the intermediate speed Vb (or the intermediate return-speed Vb') to a point when a predetermined elapse condition is satisfied.

According to the above control methods, effects corresponding to those achieved by the above-described controller 10 can be obtained.

Figure 10:
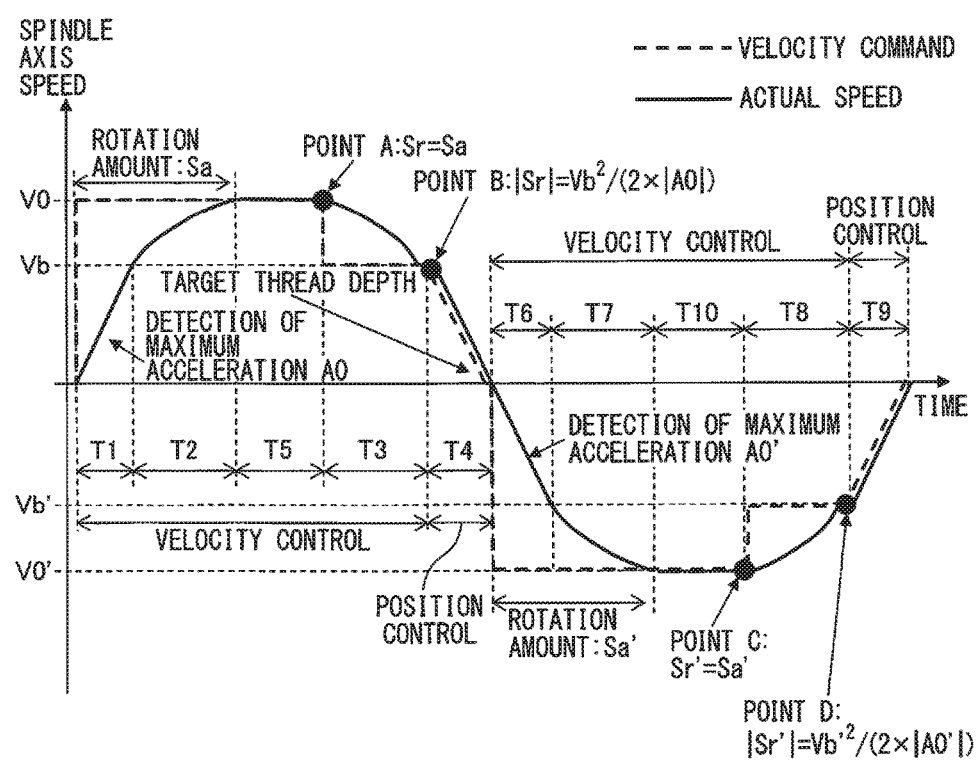
FIG. 10 is a diagram showing a still further example of the motion of a spindle axis, achieved in the embodiment of FIGS. 1-4.

In the embodiments shown in FIGS. 2 to 6, the controller 10 is configured to execute, after the accelerated rotation at maximum capacity of the spindle axis 12, the velocity control so as to make the spindle axis 12 perform the decelerated rotation (or the decelerated inverse rotation) at the gradually increasing deceleration Ac (or Ac') from the point A (or C) by the successively updated velocity command Cv (or Cv'), so that the residual rotation amount Sr (or the residual return-rotation amount Sr') of the spindle axis 12 when reaching the intermediate speed Vb (or the intermediate return-speed Vb') becomes equal to the positioning rotation amount Spos (or the positioning return-rotation amount Spos'). In place of the above velocity control during the decelerated rotation (or the decelerated inverse rotation), the controller 10 may also be configured to execute a velocity control so as to make the spindle axis 12 perform a decelerated rotation (or a decelerated inverse rotation) at maximum capacity from the point A (or C) with an intermediate speed Vb (or an intermediate return-speed Vb') set as a target value. FIGS. 9 and 10 show two different examples of motions of the spindle axis 12, achieved by a control method to make the spindle axis 12 perform a decelerated rotation (or a decelerated inverse rotation) at maximum capacity from the point A (or C). The configuration of making the spindle axis 12 perform a maximum deceleration by a velocity control will be described below with reference to FIGS. 9 and 10 together with FIG. 1.

Referring to FIG. 9, one example of the cutting motion of the spindle axis 12, in the case where the residual rotation amount Sr reaches one-half of the total rotation amount S0 before the current speed Vc reaches the maximum rotation speed V0, as well as one example of the return motion of the spindle axis 12, in the case where the residual return-rotation amount Sr' reaches one-half of the total return-rotation amount S0' before the current speed Vc' of inverse rotation reaches the maximum return-rotation speed V0', are depicted by a speed-time curve. On the other hand, referring to FIG. 10, one example of the cutting motion of the spindle axis 12, in the case where the current speed Vc reaches the maximum rotation speed V0 before the residual rotation amount Sr reaches one-half of the total rotation amount S0, as well as one example of the return motion of the spindle axis 12, in the case where the current speed Vc' of inverse rotation reaches the maximum return-rotation speed V0' before the residual return-rotation amount Sr' reaches one-half of the total return-rotation amount S0', are depicted by a speed-time curve. The motion of the spindle axis 12 in the time periods T1, T2, T4-T7, T9 and T10, shown in FIGS. 9 and 10, are similar to the motion of the spindle axis 12 in the time periods T1, T2, T4-T7, T9 and T10, shown in FIGS. 5 and 6.

During the time period T3 shown in FIGS. 9 and 10, the spindle-axis control section 18 (the decelerating-motion control section 38) executes a velocity control to make the spindle axis 12 perform a decelerated rotation at maximum capacity using the maximum permissible current of a drive source from the point A with the intermediate speed Vb set as a target value. During the decelerated rotation at maximum capacity, the deceleration of the spindle axis 12 gradually increases due to the characteristics of the spindle motor. In this connection, it is assumed that a torque necessary for acceleration of the spindle axis 12 (hereinafter referred to as an acceleration torque) is equal to a torque necessary for deceleration of the spindle axis 12 (hereinafter referred to as a deceleration torque). In general, mechanical load (or resistance) arises during the rotation of the spindle axis 12 and thus the acceleration torque becomes larger than the deceleration torque. Therefore, if the acceleration torque is equal to the deceleration torque, a time required for the acceleration at maximum capacity becomes longer than a time required for the deceleration at maximum capacity provided that the changes of speed thereof correspond to each other. Accordingly, the spindle axis 12 decelerating from the point A reaches the intermediate speed Vb in a time period shorter than the time period T2, and the position |Sr| of that time is represented by:

$$|Sr| > Vc^2/(2 \times |A0|)$$

and thereafter, the spindle axis 12 rotates at the constant intermediate speed Vb for a very short time, so as to reach the point B represented by:

$$|Sr| = Vb^2/(2 \times |A0|)$$

(see FIGS. 9 and 10).

In an analogous manner, during the time period T8 shown in FIGS. 9 and 10, the spindle-axis control section 18 (the decelerating-motion control section 38) executes a velocity control to make the spindle axis 12 perform a decelerated inverse rotation at maximum capacity using the maximum permissible current of a drive source from the point C with the intermediate return-speed Vb' set as a target value. During the decelerated inverse rotation at maximum capacity, the deceleration of inverse rotation of the spindle axis 12 gradually increases due to the characteristics of the spindle motor. In the same manner as the aforementioned motion immediately before the point B, the spindle axis 12 decelerating from the point C reaches the intermediate return-speed Vb' in a time period shorter than the time period T7, and the position |Sr'| of that time is represented by:

$$|Sr'| > Vc'^2/(2 \times |A0'|)$$

and thereafter, the spindle axis 12 rotates at the constant intermediate return-speed Vb' for a very short time, so as to reach the point D represented by:

$$|Sr'| = Vb'^2/(2 \times |A0'|)$$

(see FIGS. 9 and 10).

In the configuration shown in FIGS. 9 and 10, wherein the spindle axis 12 performs the decelerated rotation (or the decelerated inverse rotation) at maximum capacity from the maximum speed, the acceleration of the spindle axis 12 significantly changes during the decelerated rotation (or the decelerated inverse rotation) thereof at a time point when the spindle axis 12 reaches the intermediate speed Vb (or the intermediate return-speed Vb') immediately before the point B (or D), and also at the point B (or D) where the velocity control is switched to the position control. The controller 10 may have a configuration wherein the spindle-axis control section 18 executes, when the spindle axis 12 moves past the above-described acceleration changing points, a control routine analogous to the position control routine executed in the embodiments shown in FIGS. 2-6, so as to limit the range of fluctuation of a torque command at the acceleration changing points to a predetermined range.

When the spindle axis 12 passes through the point B (or D), the torque-command limiting section 42 limits the fluctuation of the torque command of the position control, which is instructed from the positioning-motion control section 40 to the spindle axis 12, to a predetermined range over a predetermined period immediately after the spindle axis 12 reaches the point B (or D). Consequently, a change in the acceleration of the spindle axis 12 immediately after the point B (or D) is able to be suppressed. On the other hand, when the spindle axis 12 passes through a point immediately before the point B (or D), where the spindle axis reaches the intermediate speed Vb (or the intermediate return-speed Vb'), the torque-command limiting section 42 limits the fluctuation of the torque command of the velocity control, which is instructed from the decelerating-motion control section 38 to the spindle axis 12, to a predetermined range over a predetermined period immediately after the spindle axis 12 reaches the intermediate speed Vb (or the intermediate return-speed Vb'). Consequently, a change in the acceleration of the spindle axis 12 immediately after the point of reaching the intermediate speed Vb (or the intermediate return-speed Vb') is able to be suppressed.

The configuration wherein the torque-command limiting section 42 limits the fluctuation of the torque command of the velocity control corresponds to a configuration wherein, in the block diagram shown in FIG. 7A, a switching unit W provided between the position processing block and the velocity processing block is switched to eliminate a position control loop. According to such configuration, it is possible to reduce a mechanical or structural shock that may be caused on the spindle axis 12 due to the change in acceleration, and to reduce a synchronization error that may be caused between the spindle axis 12 and the feed axis 14 due to the change in acceleration, analogously to the embodiments shown in FIGS. 2-6.

Figure 11:
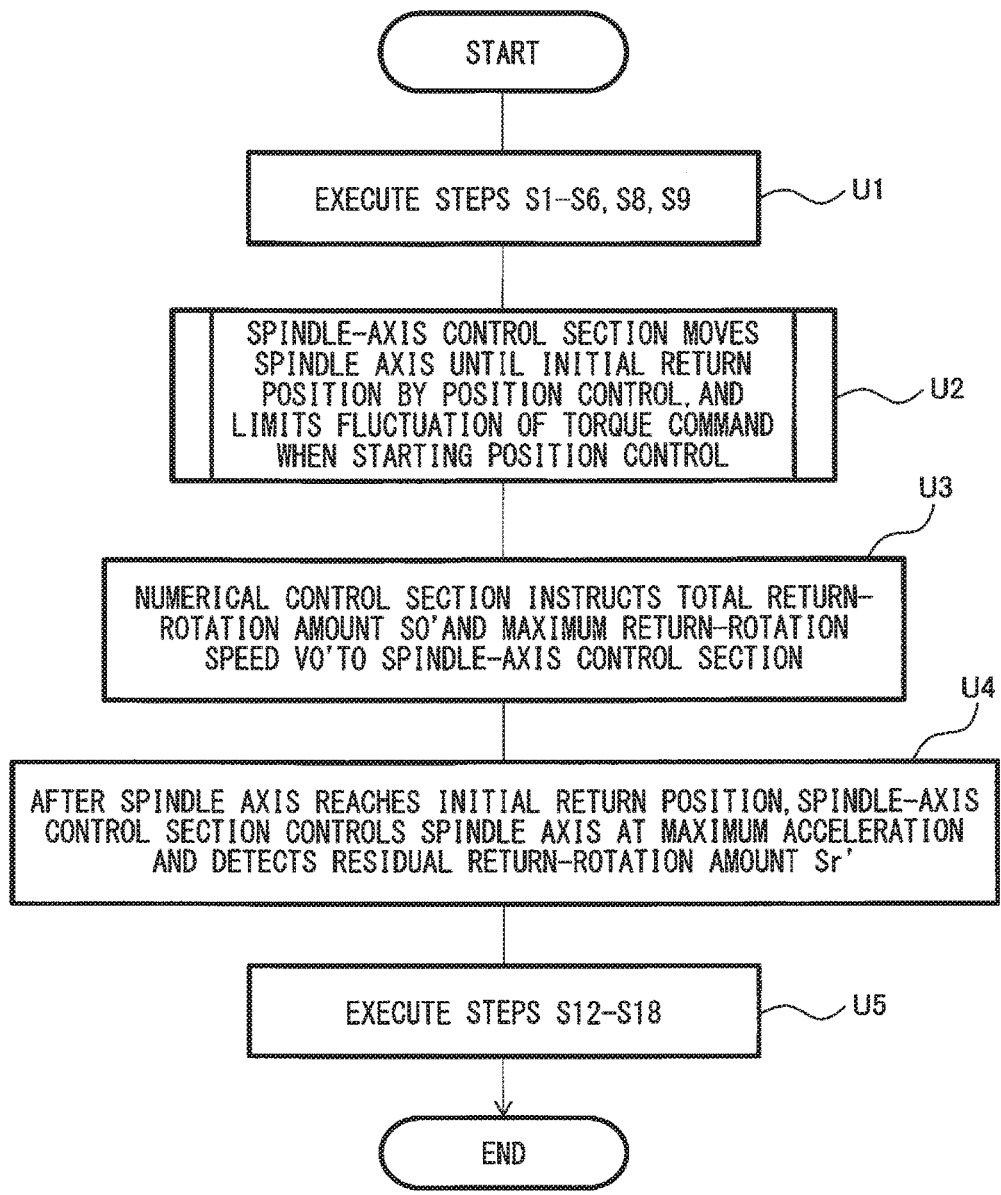
FIG. 11 is a flowchart showing a cutting-and-return motion control method for a tapping process, which is the second embodiment of a machine tool control method.

The controller 10 shown in FIG. 1 is capable of executing a machine tool control method different from the aforementioned machine tool control method. FIG. 11 shows a cutting and return motion control method adapted to be performed for the spindle axis 12 in a tapping process, as the second embodiment of a machine tool control method executable by the controller 10. FIGS. 12 to 15 correspond respectively to FIGS. 5, 6, 9 and 10, and show four examples of the cutting and return motion of the spindle axis 12 in the second embodiment shown in FIG. 11. With reference to FIGS. 1-4 and 11-15, the machine tool control method (i.e., the cutting and return motion control method in the tapping process) of the second embodiment, as well as the configuration of the controller 10 executing this method, will be described below.

In summary, in the second embodiment shown in FIGS. 11 to 15, the controller 10 executes several steps analogous to the steps in the cutting motion control method of the tapping process shown in FIG. 2, and thereby controls the cutting motion of the spindle axis 12, during a period when the spindle axis 12 is moved from the process start position to the target thread depth. On the other hand, the spindle-axis control section 18 (the positioning-motion control section 40) of the controller 10 is configured not to make the spindle axis 12 stop at the target thread depth (i.e., not to set the acceleration to zero) at an instant when the spindle axis 12 reaches the target thread depth, but to make the spindle axis 12 perform an accelerated inverse rotation at maximum capacity until a rotational position (hereinafter referred to as an initial return position), at which the spindle axis has returned by a predetermined rotation number from the target thread depth, at the maximum acceleration A0' (negative value) of inverse rotation, which is equal to the maximum deceleration A0 (negative value) in the decelerated rotation at maximum capacity. After making the spindle axis 12 perform the accelerated inverse rotation until the initial return position, the controller 10 executes several steps analogous to the steps in the return motion control method of the tapping process shown in FIG. 4, and thereby controls the return motion of the spindle axis 12. The configuration of the second embodiment will be described in detail below. However, the description of components corresponding to those in the flowcharts of FIGS. 2-4 will be omitted as appropriate.

As shown in FIG. 11, the controller 10 first executes, at step U1, the processes of steps S1 to S6, S8 and S9 shown in FIG. 2. More specifically, the numerical control section 16 (the spindle-axis command outputting section 26) instructs the total rotation amount S0 and the maximum rotation speed V0, of the spindle axis 12, to the spindle-axis control section 18 (step S1). The spindle-axis control section 18 (the initial-motion control section 30, the maximum-acceleration detecting section 32 and the residual rotation-amount detecting section 34) makes the spindle axis 12 perform the accelerated rotation at maximum capacity to perform the cutting motion from the process start position, with the maximum rotation speed V0 set as a target speed, and detects the maximum acceleration A0 and the residual rotation amount Sr during the accelerated rotation (step S2). Thereafter, the spindle-axis control section 18 (the current-speed detecting section 36) sequentially detects the current speed Vc during the accelerated rotation at maximum capacity, and judges whether the current speed Vc has not reached the maximum rotation speed V0 (step S3). If Vc has not yet reached V0, the spindle-axis control section 18 (the decelerating-motion control section 38) judges whether the residual rotation amount Sr is equal to or less than one-half of the total rotation amount S0 (step S4). If Sr is equal to or less than one-half of S0, the spindle-axis control section 18 (the decelerating-motion control section 38) executes a velocity control to make the spindle axis 12 perform the decelerated rotation until the intermediate speed Vb so as to continuously perform the cutting motion (step S5). On the other hand, if it is judged that the current speed Vc has reached the maximum rotation speed V0 (step S3), the spindle-axis control section 18 (the decelerating-motion control section 38) stores a rotation amount (i.e., a rotational position FBS) of the spindle axis 12 from the process start position at an instant when the spindle axis reaches the maximum rotation speed V0, as an acceleration rotation amount Sa (step S8), and judges whether the residual rotation amount Sr is equal to or less than the acceleration rotation amount Sa (step S9). If Sr is equal to or less than Sa, the spindle-axis control section 18 (the decelerating-motion control section 38) makes the spindle axis 12 perform the decelerated rotation until the intermediate speed Vb so as to continuously perform the cutting motion (step S5). Thereafter, the spindle-axis control section 18 (the positioning-motion control section 40) judges whether the residual rotation amount Sr of the spindle axis 12 at the current position satisfies the equation 1:

$$|Sr|=Vb^2/(2\times|A0|) \qquad \text{(step S6)}.$$

Figure 12:
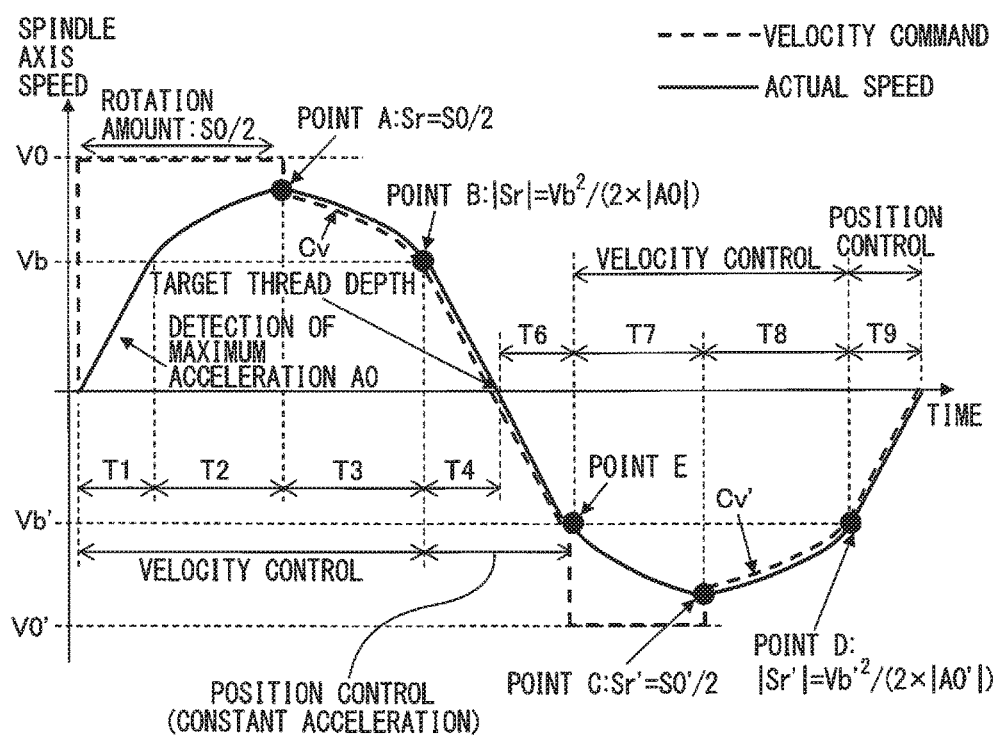
FIG. 12 is a diagram showing one example of the motion of a spindle axis, achieved in the embodiment of FIGS. 1 and 11.

Referring now to FIG. 12, one example of the cutting motion of the spindle axis 12, in the case where the residual rotation amount Sr reaches one-half of the total rotation amount S0 before the current speed Vc reaches the maximum rotation speed V0 during the cutting motion at step U1 of FIG. 11 (i.e., in the case where the judgment results at respective steps S3 and S4 of FIG. 2 are YES), is depicted by a speed-time curve (the curve above a time axis). The motions of the spindle axis 12 in time periods T1, T2, T3 and T4 in the speed-time curve of FIG. 12 correspond to the motions of the spindle axis 12 in time periods T1, T2, T3 and T4 in the aforementioned speed-time curve of FIG. 5. More specifically, as shown in FIG. 12, the accelerated rotation of the spindle axis 12 at maximum capacity (by a velocity control) is performed during the time periods T1 and T2; then at the time point A when the residual rotation amount Sr reaches one-half of the total rotation amount S0 (i.e., when the judgment result at step S4 of FIG. 2 becomes YES), the motion of the spindle axis 12 changes from the accelerated rotation to the decelerated rotation; thereafter, the decelerated rotation of the spindle axis 12 at gradually increasing deceleration Ac (by a velocity control) is performed in the time period T3; and thereafter, the decelerated rotation of the spindle axis 12 at maximum deceleration A0 (by a position control) is performed in the time period T4.

With the execution of step U1 (i.e., steps S1 to S2 to S3 to S4 to S5 to S6 of FIG. 2 in this order) by the controller 10, the spindle axis 12 operates, in the time periods T1, T2 and T3 shown in FIG. 12, in the same way as the operation in the time periods T1, T2 and T3 shown in FIG. 5 as described above. If the spindle-axis control section 18 (the positioning-motion control section 40) judges that the residual rotation amount Sr of the spindle axis 12 satisfies the aforementioned equation 1 at step U1 (step S6 of FIG. 2), the spindle-axis control section 18 (the positioning-motion control section 40) prepares, at step U2 of FIG. 11 instead of step S7 of FIG. 2, a movement command for making the spindle axis 12 perform the decelerated rotation at the maximum deceleration A0 so as to reach the point of Sr=0 (i.e., the target thread depth) and subsequently perform the accelerated inverse rotation until the initial return position (i.e., time point E shown in FIG. 12) at the maximum acceleration A0' of inverse rotation, identical to the maximum deceleration A0 (i.e., A0=A0'), and executes a position control for the spindle axis 12 with use of the prepared movement command. Further, in step U2, the spindle-axis control section 18 (the torque-command limiting section 42) limits the range of fluctuation of a torque command used in the position control to a predetermined range over a predetermined torque-command limiting period, when the positioning-motion control section 40 starts the position control.

During the position control at step U2, the spindle-axis control section 18 (the positioning-motion control section 40 and the torque-command limiting section 42) executes the aforementioned position control routine shown in FIG. 3. In the illustrated embodiment, steps Q1 to Q7 and Q9 of the position control routine executed in step U2 correspond to steps Q1 to Q7 and Q9 of the position control routine executed in step S7 of FIG. 2. At step Q7, the torque-command limiting section 42 applies the limiting value L to the torque command determined by the positioning-motion control section 40 over the predetermined torque-command limiting period, in a manner as described above, so as to limit the range of fluctuation of the torque command. In the illustrated embodiment, after the torque command is determined, the positioning-motion control section 40 judges, at step Q8, whether or not the spindle axis 12 has reached the target position (or the initial return position) based on the sequentially detected residual rotation amount Sr. If the spindle axis 12 has reached the initial return position, the position control routine is finished. If the spindle axis 12 has not reached the initial return position, the control flow returns to step Q1 and the position control routine is repeated. In this way, the torque-command limiting section 42 limits the fluctuation of the torque command of the position control, instructed from the positioning-motion control section 40 to the spindle axis 12, to the range defined by the limiting value L, over the time period until any one of the elapse conditions, i.e., the elapse of the time t1, the decrease of the current speed Vc to the speed V1 or below and the decrease of the residual rotation amount Sr to the rotation amount S1 or below, is satisfied.

Turning back to FIG. 12, the spindle axis 12 performs, in accordance with the movement command from the spindle-axis control section 18 (the positioning-motion control section 40), the cutting motion from the point B toward the target thread depth while performing the decelerated rotation at the maximum deceleration A0, and reaches the target thread depth when Sr becomes equal to zero (in the time period T4). At the moment the spindle axis 12 reaches the target thread depth, the current speed Vc of the spindle axis 12 becomes equal to zero, but the spindle axis 12 further operates, in accordance with the movement command from the spindle-axis control section 18 (the positioning-motion control section 40), to maintain the maximum deceleration A0 and generate the maximum acceleration A0' of inverse rotation, and performs a return motion from the target thread depth toward the initial return position (point E) over the time period T6 by the accelerated inverse rotation for gradually increasing the current speed Vc (negative value). In this way, in the time period T4 in which the spindle axis operates from the point B to reach the target thread depth and in the time period T6 in which the spindle axis operates from the target thread depth to reach the point E, the spindle-axis control section 18 executes a position control for the spindle axis 12 (step U2) and continuously moves the spindle axis 12 at a constant acceleration (i.e., the maximum deceleration A0 and the maximum acceleration A0' of inverse rotation) (a velocity command at the constant acceleration, obtained from the movement command, is shown by a broken line). Note that, although the current speed Vc of the spindle axis 12 becomes zero at the target thread depth, this is a momentary phenomenon, and thus should not be considered as to stop at the target thread depth.

The initial return position (point E) of the spindle axis 12 can be set arbitrarily. For example, as shown in FIG. 12, the point E may be set at a position at which the current speed Vc' of inverse rotation of the spindle axis 12 reaches the intermediate return-speed Vb', in the same way as the point B at which the decelerated rotation at the maximum deceleration A0 (by the position control) starts during the cutting motion. In this configuration, the position of the point E is considered as a position where the spindle axis 12 reaches by performing the inverse rotation from the target thread depth by a rotation amount corresponding to $|Sr|=Vb^2/(2\times|A0|)$. The return motion of the spindle axis 12 by the position control in the time period T6 is analogous to the return motion of the spindle axis 12 by the velocity control in the time period T6 shown in FIG. 5. However, because of control characteristics, the maximum deceleration A0 (in the time period T4) during the decelerated rotation at maximum capacity by the position control tends to be slightly suppressed in comparison to the maximum acceleration A0 (in the time period T1) during the accelerated rotation at maximum capacity by the velocity control, and as a result, the maximum acceleration A0' of inverse rotation in the time period T6 also tends to be slightly lowered in comparison to the maximum acceleration A0 in the time period T1.

Figure 13:
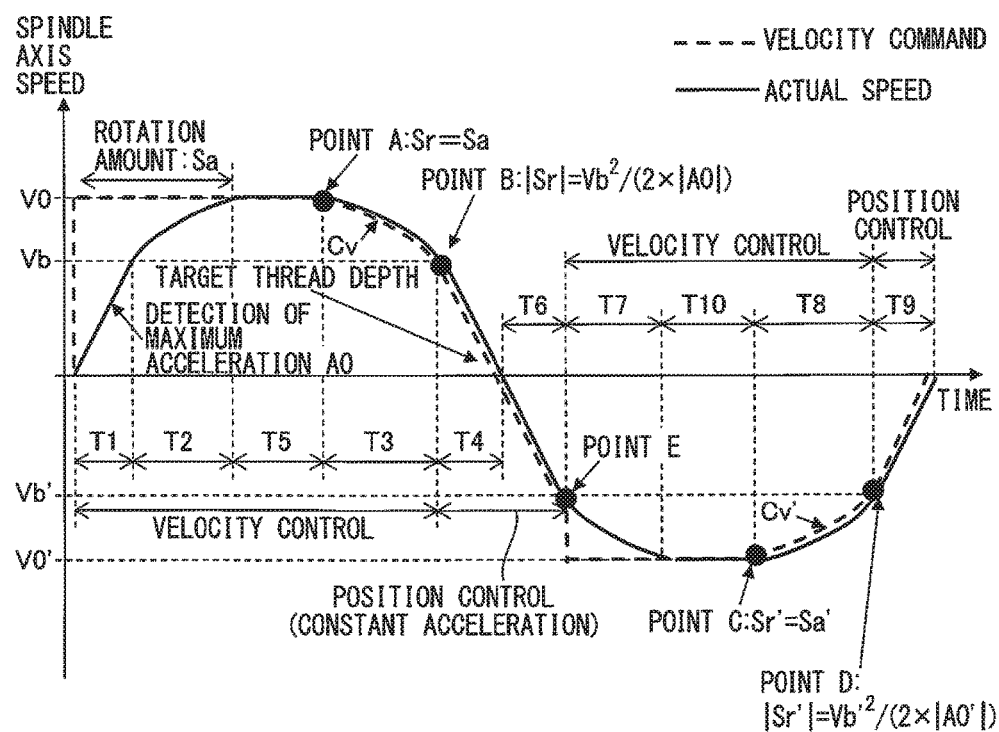
FIG. 13 is a diagram showing another example of the motion of a spindle axis, achieved in the embodiment of FIGS. 1 and 11.

Referring now to FIG. 13, one example of the cutting motion of the spindle axis 12, in the case where the current speed Vc reaches the maximum rotation speed V0 before the residual rotation amount Sr reaches one-half of the total rotation amount S0 during the cutting motion at step U1 of FIG. 11 (i.e., in the case where the judgment result at step S3 of FIG. 2 is NO), is depicted by a speed-time curve (the curve above a time axis). The motions of the spindle axis 12 in time periods T1, T2, T5, T3 and T4 in the speed-time curve of FIG. 13 correspond to the motions of the spindle axis 12 in time periods T1, T2, T5, T3 and T4 in the aforementioned speed-time curve of FIG. 6. More specifically, as shown in FIG. 13, the accelerated rotation of the spindle axis 12 at maximum capacity (by a velocity control) is performed during the time periods T1 and T2, so that the current speed Vc of the spindle axis 12 reaches the maximum rotation speed V0; thereafter, the spindle axis 12 rotates at the constant speed V0 over the time period T5 so as to continue the cutting motion; then at the time point A when the residual rotation amount Sr becomes equal to the acceleration rotation amount Sa (i.e., when the judgment result at step S9 of FIG. 2 becomes YES), the motion of the spindle axis 12 changes from the accelerated rotation to the decelerated rotation; thereafter, the decelerated rotation of the spindle axis 12 at gradually increasing deceleration Ac (by a velocity control) is performed in the time period T3; and thereafter, the decelerated rotation of the spindle axis 12 at maximum deceleration A0 (by a position control) is performed in the time period T4.

With the execution of step U1 (especially, steps S1 to S2 to S3 to S8 to S9 to S5 to S6 in FIG. 2 in this order) by the controller 10, the spindle axis 12 operates, in the time periods T1, T2, T5 and T3 shown in FIG. 13, in the same way as the operation in the time periods T1, T2, T5 and T3 shown in FIG. 6 as described above. If the spindle-axis control section 18 (the positioning-motion control section 40) judges that the residual rotation amount Sr of the spindle axis 12 satisfies the aforementioned equation 1 at step U1 (step S6 of FIG. 2), the spindle-axis control section 18 (the positioning-motion control section 40) prepares, at step U2 of FIG. 11 instead of step S7 of FIG. 2, a movement command for making the spindle axis 12 perform the decelerated rotation at the maximum deceleration A0 so as to reach the point of Sr=0 (i.e., the target thread depth) and subsequently perform the accelerated inverse rotation until the initial return position (i.e., time point E shown in FIG. 13) at the maximum acceleration A0' of inverse rotation, identical to the maximum deceleration A0 (i.e., A0=A0'), and executes a position control for the spindle axis 12 with use of the prepared command. Further, in step U2, the spindle-axis control section 18 (the torque-command limiting section 42) limits the range of fluctuation of a torque command used in the position control to a predetermined range over a predetermined torque-command limiting period, when the positioning-motion control section 40 starts the position control, in a manner as described above.

In the motion examples shown in FIGS. 12 and 13, during a period when the spindle-axis control section 18 controls the rotational motion of the spindle axis 12 from the process start position to the target thread depth, the feed-axis control section 22 controls the feed axis 14 so as to perform a feed motion while following the motion of the spindle axis 12, with use of the rotational position FBS of the spindle axis 12. During a period when the spindle-axis control section 18 executes the aforementioned processes of step U1 and step U2, the numerical control section 16 monitors the residual rotation amount Sr notified from the spindle-axis control section 18, and judges that the tapping process has reached the target thread depth when the residual rotation amount Sr becomes equal to or less than a first predetermined value (a very small value close to zero). Then, the numerical control section 16 (the spindle-axis command outputting section 26) obtains, after it is judged that the tapping process has reached the target thread depth, the total return-rotation amount S0' and the maximum return-rotation speed V0', of the spindle axis 12, during a period when the spindle axis operates from the target thread depth to the return completion position, from a command value provided in the tapping program P interpreted by the program interpreting section 24, and sends the total return-rotation amount S0' and the maximum return-rotation speed V0' as the spindle axis command CS to the spindle-axis control section 18, at step U3 (FIG. 11) and concurrently with step U2.

After the spindle axis 12 has reached the initial return position (point E), the spindle-axis control section 18 (the initial-motion control section 30) makes, at step U4 (FIG. 11), the spindle axis 12 perform an accelerated inverse rotation at maximum capacity using the maximum permissible current of the drive source, from the initial return position (point E) toward the return completion position, with the maximum return-rotation speed V0' set as a target speed, so as to perform the return motion. The spindle-axis control section 18 (the residual rotation-amount detecting section 34) sequentially detects a residual return-rotation amount Sr' of the spindle axis 12 during a period when the spindle axis operates from a current position to the return completion position, based on the total return-rotation amount S0' and the rotational position FBS. The spindle-axis control section 18 notifies the detected residual return-rotation amount Sr' to the numerical control section 16 every time it is detected. In this embodiment, the maximum-acceleration detecting section 32 does not detect a maximum acceleration of inverse rotation of the spindle axis 12 during the time period T6, but obtains the maximum deceleration A0 in the decelerated rotation at maximum capacity during the time period T4 (which corresponds to the maximum acceleration A0 during the time period T1) as the maximum acceleration A0' of inverse rotation of the spindle axis 12 performing the accelerated inverse rotation from the target thread depth.

Next, the controller 10 executes, at step U5 (FIG. 11), the processes of steps S12 to S18 shown in FIG. 4. More specifically, the spindle-axis control section 18 (the current-speed detecting section 36) sequentially detects the current speed Vc' of inverse rotation based on the rotational position FBS during the accelerated inverse rotation at maximum capacity, and judges whether the current speed Vc' has not reached the maximum return-rotation speed V0' (step S12). If Vc' has not reached V0', the spindle-axis control section 18 judges whether the residual return-rotation amount Sr' is equal to or less than one-half of the total return-rotation amount S0' (step S13). If Sr' is equal to or less than one-half of S0', the spindle-axis control section 18 makes the spindle axis 12 perform the decelerated inverse rotation until the intermediate return-speed Vb' so as to continuously perform the return motion (step S14). On the other hand, if it is judged that the current speed Vc' has reached the maximum return-rotation speed V0' (step 12), the spindle-axis control section 18 stores a rotation amount of the spindle axis 12 from the target thread depth (i.e., a rotational position FBS) at an instant when the spindle axis reaches the maximum return-rotation speed V0', as the acceleration rotation amount Sa' of the return motion (step S17), and judges whether the residual return-rotation amount Sr' is equal to or less than the acceleration rotation amount Sa' (step S18). If Sr' is equal to or less than Sa', the spindle-axis control section 18 makes the spindle axis 12 perform the decelerated inverse rotation until the intermediate return-speed Vb' so as to continuously perform the return motion (step S14). Thereafter, the spindle-axis control section 18 (the positioning-motion control section 40) judges whether the residual return-rotation amount Sr' of the spindle axis 12 at the current position satisfies the equation 2: $|Sr'|=Vb'^2/(2\times|A0'|)$ (step S15). If the equation 2 is satisfied, the spindle-axis control section 18 (the positioning-motion control section 40) prepares a movement command for making the spindle axis 12 perform the decelerated inverse rotation at the maximum deceleration A0' (corresponding to the maximum acceleration A0' of inverse rotation in the time period T6) and stop at the point of Sr'=0 (i.e., the return completion position), and executes a position control for the spindle axis 12 with use of the prepared movement command (step S16). Meanwhile, the spindle-axis control section 18 (the torque-command limiting section 42) limits the range of fluctuation of a torque command of the position control to the predetermined range over the predetermined torque-command limiting period at the start of the position control executed by the positioning-motion control section 40. The spindle axis 12 performs the return motion toward the return completion position, in accordance with the movement command from the spindle-axis control section 18 (the positioning-motion control section 40), by performing the decelerated inverse rotation at maximum deceleration A0', and reaches and stops at the return completion position when Sr' becomes equal to zero.

Referring now to FIG. 12, one example of the return motion of the spindle axis 12, in the case where the residual return-rotation amount Sr' reaches one-half of the total return-rotation amount S0' before the current speed Vc' of inverse rotation reaches the maximum return-rotation speed V0' at step U5 of FIG. 11 (i.e., in the case where the judgment results at respective steps S12 and S13 of FIG. 4 are YES), is depicted by a speed-time curve (the curve below a time axis). The motions of the spindle axis 12 in time periods T7, T8 and T9 in the speed-time curve of FIG. 12 correspond to the motions of the spindle axis 12 in time periods T7, T8 and T9 in the aforementioned speed-time curve of FIG. 5. In the motion example of FIG. 12, after the spindle axis 12 moves from the target thread depth to reach the initial return position (point E) during the time period T6, the current speed Vc' of inverse rotation of the spindle axis 12 exceeds the intermediate return-speed Vb' (negative value), so that the acceleration of inverse rotation of the spindle axis 12 in the accelerated inverse rotation at maximum capacity gradually decreases from the maximum acceleration A0' due to the characteristics of the spindle motor (in the time period T7). At a time point C when the residual return-rotation amount Sr' reaches one-half of the total return-rotation amount S0' (i.e., when the judgment result at step S13 of FIG. 4 becomes YES), the motion of the spindle axis 12 changes from the accelerated inverse rotation to the decelerated inverse rotation; thereafter, the decelerated inverse rotation of the spindle axis 12 at gradually increasing deceleration Ac' (by a velocity control) is performed in the time period T8; and thereafter, the decelerated inverse rotation of the spindle axis 12 at maximum deceleration A0' (by a position control) is performed in the time period T9.

During the position control in the time period T9 at step U5, the spindle-axis control section 18 (the positioning-motion control section 40 and the torque-command limiting section 42) executes the aforementioned position control routine shown in FIG. 3. In the illustrated embodiment, steps Q1 to Q7 and Q9 of the position control routine executed in step U5 correspond to steps Q1 to Q7 and Q9 of the position control routine executed in step S16 of FIG. 4. At step Q7, the torque-command limiting section 42 applies the limiting value L to the torque command determined by the positioning-motion control section 40 over the predetermined torque-command limiting period, in a manner as described above, so as to limit the range of fluctuation of the torque command. In the illustrated embodiment, after the torque command is determined, the positioning-motion control section 40 judges, at step Q8, whether or not the spindle axis 12 has reached the target position (or the return completion position) based on the sequentially detected residual return-rotation amount Sr'. If the spindle axis 12 has reached the return completion position, the position control routine is finished. If the spindle axis 12 has not reached the return completion position, the control flow returns to step Q1 and the position control routine is repeated. In this way, the torque-command limiting section 42 limits the fluctuation of the torque command of the position control, instructed from the positioning-motion control section 40 to the spindle axis 12, to the range defined by the limiting value L, over the time period until any one of the elapse conditions, i.e., the elapse of the time t1, the decrease of the current speed Vc' of inverse rotation to the speed V1 or below and the decrease of the residual return-rotation amount Sr' to the rotation amount S1 or below, is satisfied.

On the other hand, referring to FIG. 13, one example of the return motion of the spindle axis 12, in the case where the current speed Vc' of inverse rotation reaches the maximum return-rotation speed V0' before the residual return-rotation amount Sr' reaches one-half of the total return-rotation amount S0' at step U5 of FIG. 11 (i.e., in the case where the judgment result at step S12 of FIG. 4 is NO), is depicted by a speed-time curve (the curve below a time axis). The motions of the spindle axis 12 in time periods T7, T10, T8 and T9 in the speed-time curve of FIG. 13 correspond to the motions of the spindle axis 12 in time periods T7, T10, T8 and T9 in the aforementioned speed-time curve of FIG. 6. In the motion example of FIG. 13, during the time period T7 after the spindle axis 12 reaches the initial return position (point E), the accelerated inverse rotation of the spindle axis 12 at maximum capacity by the gradually decreasing acceleration ($\leq A0'$) is performed in a way similar to the motion example of FIG. 12, so that the current speed Vc' of inverse rotation of the spindle axis 12 reaches the maximum return-rotation speed V0'. Thereafter, the spindle axis 12 inversely rotates at the constant speed V0' over the time period T10 so as to continue the return motion. At a time point C when the residual return-rotation amount Sr' becomes equal to the acceleration rotation amount Sa' (i.e., when the judgment result at step S18 of FIG. 4 becomes YES), the motion of the spindle axis 12 changes from the accelerated inverse rotation to the decelerated inverse rotation; thereafter, the decelerated inverse rotation of the spindle axis 12 at gradually increasing deceleration Ac' (by a velocity control) is performed in the time period T8; and thereafter, the decelerated inverse rotation of the spindle axis 12 at maximum deceleration A0' (by a position control) is performed in the time period T9. Further, in the time period T9, the spindle-axis control section 18 (the torque-command limiting section 42) limits the range of fluctuation of a torque command used in the position control to a predetermined range over a predetermined torque-command limiting period, when the positioning-motion control section 40 starts the position control, in a manner as described above.

In the motion examples shown in FIGS. 12 and 13, during a period when the spindle-axis control section 18 controls the inverse rotational motion of the spindle axis 12 from the target thread depth to the return completion position, the feed-axis control section 22 controls the feed axis 14 so as to perform an inverse feed motion while following the motion of the spindle axis 12, with use of the rotational position FBS of the spindle axis 12. During a period when the spindle-axis control section 18 executes the aforementioned processes from step U3 to step U5, the numerical control section 16 monitors the residual return-rotation amount Sr' notified from the spindle-axis control section 18, and judges that the return motion is completed and the tool has been pulled out from the workpiece when the residual return-rotation amount Sr' becomes equal to or less than a second predetermined value (a very small value close to zero).

Figure 14:
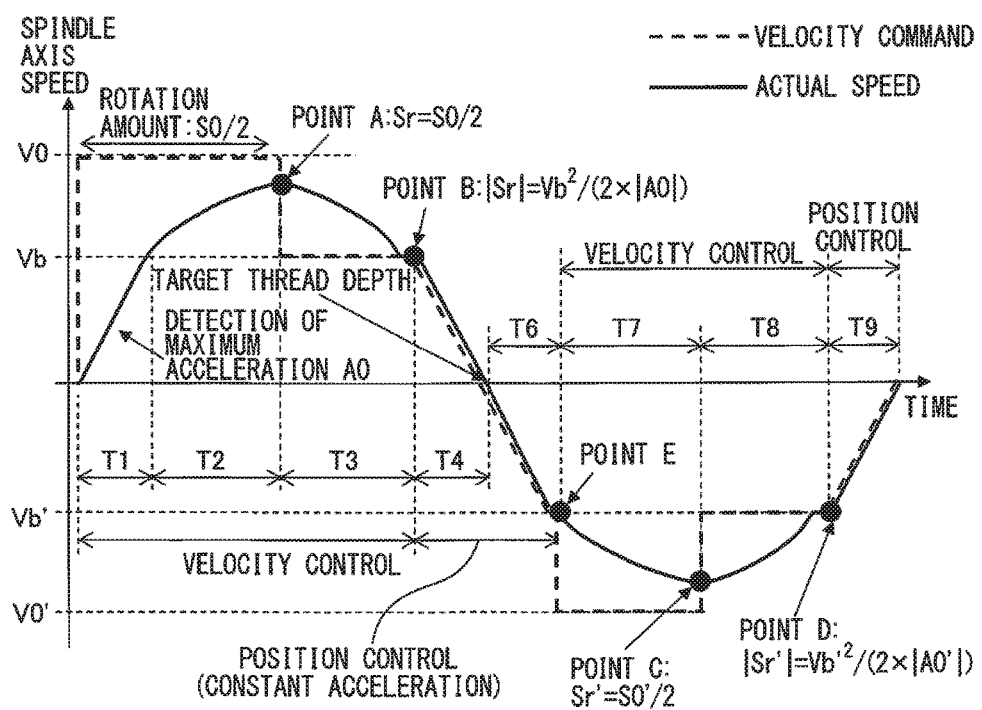
FIG. 14 is a diagram showing a further example of the motion of a spindle axis, achieved in the embodiment of FIGS. 1 and 11.
Figure 15:
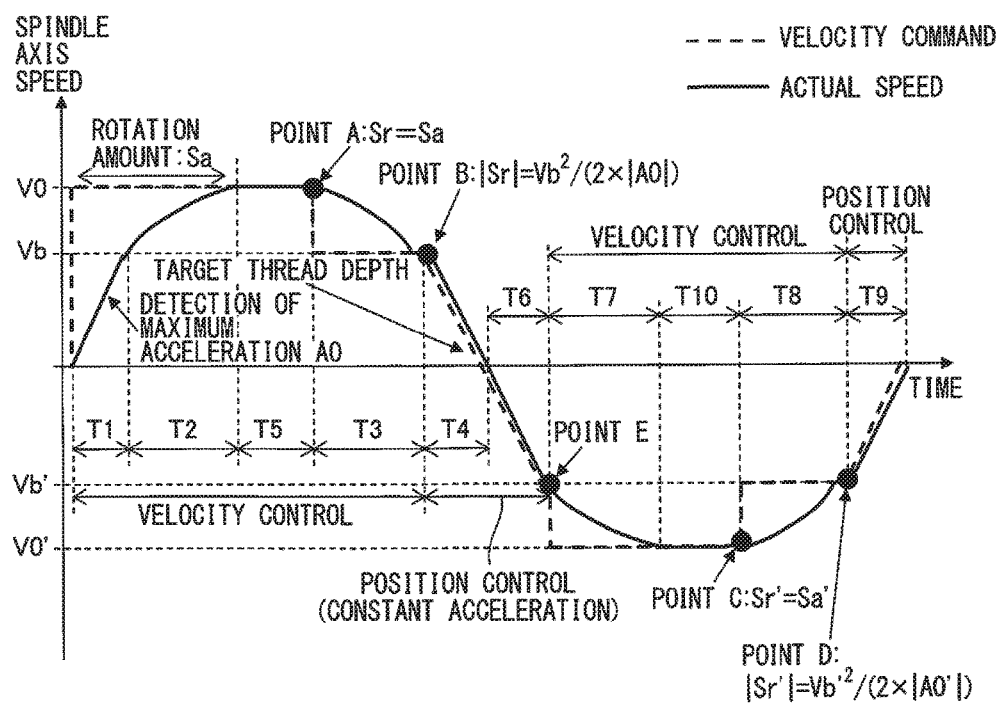
FIG. 15 is a diagram showing a still further example of the motion of a spindle axis, achieved in the embodiment of FIGS. 1 and 11.

FIGS. 14 and 15 show two different examples of motions of the spindle axis 12, achieved by a control method to make the spindle axis 12 perform a decelerated rotation (or a decelerated inverse rotation) at maximum capacity from the point A (or C), which are analogous to the aforementioned motion examples shown in FIGS. 9 and 10. The motion of the spindle axis 12 in the time periods T1, T2, T4-T7, T9 and T10, shown in FIGS. 14 and 15, are similar to the motion of the spindle axis 12 in the time periods T1, T2, T4-T7, T9 and T10, shown in FIGS. 12 and 13. In the time period T3 shown in FIGS. 14 and 15, the spindle axis 12 decelerates from the point A and then reaches the intermediate speed Vb in a time period shorter than the time period T2, and thereafter, the spindle axis 12 rotates at the constant intermediate speed Vb for a very short time, so as to reach the point B. Analogously, in the time period T8 shown in FIGS. 14 and 15, the spindle axis 12 decelerates from the point C and then reaches the intermediate return-speed Vb' in a time period shorter than the time period T7, and thereafter, the spindle axis 12 rotates at the constant intermediate return-speed Vb' for a very short time, so as to reach the point D.

Analogously to the motion examples of FIGS. 12 and 13, when the spindle axis 12 passes through the point B (or D), the torque-command limiting section 42 limits the fluctuation of the torque command of the position control, which is instructed from the positioning-motion control section 40 to the spindle axis 12, to a predetermined range over a predetermined period immediately after the spindle axis 12 reaches the point B (or D). On the other hand, when the spindle axis 12 passes through a point immediately before the point B (or D), where the spindle axis reaches the intermediate speed Vb (or the intermediate return-speed Vb'), the torque-command limiting section 42 limits the fluctuation of the torque command of the velocity control, which is instructed from the decelerating-motion control section 38 to the spindle axis 12, to a predetermined range over a predetermined period immediately after the spindle axis 12 reaches the intermediate speed Vb (or the intermediate return-speed Vb').

The controller 10 according to the embodiments depicted in FIGS. 11 to 15 has a configuration wherein, when the spindle axis 12 performs the cutting motion from the process start position to the target thread depth, the numerical control section 16 instructs only the total rotation amount S0 and the maximum rotation speed V0, of the spindle axis 12, as the spindle axis command CS to the spindle-axis control section 18, and the spindle-axis control section 18 performs, in accordance with the spindle axis command CS, the cutting motion by accelerating the spindle axis 12 with the maximum power using the maximum permissible current, aiming at the maximum rotation speed V0, and continuously performs, based on the sequentially detected residual rotation amount Sr and current speed Vc of the spindle axis 12, the cutting motion until the target thread depth while decelerating the spindle axis 12 at the maximum deceleration A0 so as to make the spindle axis reach the target thread depth. Therefore, according to the controller 10, it is no longer necessary to perform a parameter setting or adjustment, etc., required for the numerical control section 16 to prepare acceleration and deceleration commands in conformity with the power characteristics of the spindle axis 12, and it is possible, with a simple configuration, to reduce the cycle time of the tapping process by executing an acceleration and deceleration control so as to maximize the acceleration capacity of the spindle axis 12, analogously to the controller 10 according to the embodiment of FIGS. 1-10.

Further, the controller 10 depicted in FIGS. 11 to 15 has a configuration wherein, during the decelerated rotation of the spindle axis 12, the spindle-axis control section 18 (the torque-command limiting section 42) limits the range of fluctuation of a torque command of the position control, which is instructed to the spindle axis 12, to a predetermined range over a predetermined torque-command limiting period immediately after the point B where the current speed Vc reaches the intermediate speed Vb and the velocity control is switched to the position control. When the fluctuation of the torque command is limited over the predetermined time period after reaching the intermediate speed Vb and thereby the torque command is brought close to a constant value, it becomes possible to bring the acceleration of the spindle axis 12 in the same period close to a constant value. Consequently, according to the controller 10, a change in the acceleration of the spindle axis 12 immediately after the velocity control is switched to the position control during the decelerated rotation of the spindle axis 12 is able to be suppressed, and therefore, it is possible to reduce a mechanical or structural shock that may be caused on the spindle axis 12 due to the change in acceleration, and to reduce a synchronization error that may be caused between the spindle axis 12 and the feed axis 14 due to the change in acceleration. Furthermore, in the motion examples shown in FIGS. 14 and 15, a change in the acceleration of the spindle axis 12 at a point where the spindle axis 12 reaches the intermediate speed Vb, which is immediately before the point B where the velocity control is switched to the position control, is also able to be suppressed.

Moreover, the controller 10 according to the embodiments shown in FIGS. 11 to 15 has a configuration wherein, when the spindle axis 12 is made perform the return motion from the target thread depth to the return completion position, the spindle axis 12 is not made stop at the target thread depth (i.e., the acceleration is not set to zero) at the completion of the cutting motion, but is made perform the accelerated inverse rotation until the predetermined initial return position by the position control, at the maximum acceleration A0' (negative value) of inverse rotation, which is equal to the maximum deceleration A0 (negative value). According to this configuration, a change in the acceleration of the spindle axis 12 at an instant when the operation of the spindle axis 12 is changed from the cutting motion to the return motion is eliminated, so that it is possible to avoid a mechanical or structural shock that may be caused on the spindle axis 12 due to the change in the acceleration as well as an increase of synchronization error that may be caused between the spindle axis 12 and the feed axis 14 due to the change in the acceleration.

The controller 10 according to the embodiment depicted in FIGS. 11 to 15 also has a configuration wherein, after the spindle axis 12 performs the accelerated inverse rotation until the initial return position by the position control, the return motion is performed by accelerating the spindle axis 12 with the maximum power in accordance with the spindle axis command CS including only the total return-rotation amount S0' and maximum return-rotation speed V0' of the spindle axis 12, notified by the numerical control section 16 to the spindle-axis control section 18, and the return motion until the return completion position is continuously performed in the shortest time while decelerating the spindle axis 12 at the maximum deceleration A0' corresponding to the maximum acceleration A0 of inverse rotation just after the inversion of the motion so as to make the spindle axis stop at the return complete position. Therefore, according to the controller 10, it is no longer necessary to perform a parameter setting or adjustment, etc., required for the numerical control section 16 to prepare acceleration and deceleration commands in conformity with the power characteristics of the spindle axis 12, and it is possible, with a simple configuration, to reduce the cycle time of the tapping process by executing an acceleration and deceleration control so as to maximize the acceleration capacity of the spindle axis 12.

Further, the controller 10 depicted in FIGS. 11 to 15 has a configuration wherein, during the decelerated inverse rotation of the spindle axis 12, the spindle-axis control section 18 (the torque-command limiting section 42) limits the range of fluctuation of a torque command of the position control, which is instructed to the spindle axis 12, to a predetermined range over a predetermined torque-command limiting period immediately after the point D where the current speed Vc' reaches the intermediate return-speed Vb' and the velocity control is switched to the position control. When the fluctuation of the torque command is limited over the predetermined time period after the intermediate return-speed Vb' is reached and thereby the torque command is brought close to a constant value, it becomes possible to bring the acceleration of the spindle axis 12 in the same period close to a constant value. Consequently, according to the controller 10, a change in the acceleration of the spindle axis 12 immediately after the velocity control is switched to the position control during the decelerated inverse rotation of the spindle axis 12 is able to be suppressed, and therefore, it is possible to reduce a mechanical or structural shock that may be caused on the spindle axis 12 due to the change in acceleration, and to reduce a synchronization error that may be caused between the spindle axis 12 and the feed axis 14 due to the change in acceleration. Furthermore, in the motion examples shown in FIGS. 14 and 15, a change in the acceleration of the spindle axis 12 at a point where the spindle axis 12 reaches the intermediate return-speed Vb', which is immediately before the point D where the velocity control is switched to the position control, is also able to be suppressed.

While the invention has been described with reference to specific embodiments, it will be understood, by those skilled in the art, that various changes or modifications may be made thereto without departing from the scope of the following claims.

The invention claimed is:

1. A controller of a machine tool, the controller being configured to control a synchronized operation of a spindle axis and a feed axis of the machine tool, the controller comprising:
a hardware configured as:
a numerical control section configured to prepare a spindle-axis command and a feed-axis command based on a tapping program;
a spindle-axis control section configured to control a rotational motion of the spindle axis in accordance with the spindle-axis command;
a rotation detecting section configured to detect a rotational position of the spindle axis; and
a feed-axis control section configured to control a feed motion of the feed axis in accordance with the feed-axis command, based on the rotational position;
the numerical control section comprising:
a spindle-axis command outputting section configured to obtain, from the tapping program, a total rotation amount and a maximum rotation speed of the spindle axis during a period when the spindle axis operates from a starting position to a target position, and to send the total rotation amount and the maximum rotation speed as the spindle-axis command to the spindle-axis control section;
the spindle-axis control section comprising:
an initial-motion control section configured to make the spindle axis perform an accelerated rotation at maximum capacity from the starting position, by a velocity control in which the maximum rotation speed is set as a target value;
a maximum-acceleration detecting section configured to detect a maximum acceleration of the spindle axis during the accelerated rotation at maximum capacity, based on the rotational position;
a residual rotation-amount detecting section configured to detect a residual rotation amount of the spindle axis during a period when the spindle axis operates from a current position to the target position, based on the total rotation amount and the rotational position;
a current-speed detecting section configured to detect a current speed of the spindle axis based on the rotational position;
a decelerating-motion control section configured to execute a velocity control for making the spindle axis perform a decelerated rotation so as to reach a predetermined intermediate speed, based on the residual rotation amount and the current speed, after the accelerated rotation at maximum capacity;
a positioning-motion control section configured to execute a position control for making the spindle axis perform a decelerated rotation at a maximum deceleration corresponding to the maximum acceleration so as to reach the target position, based on the residual rotation amount and the current speed, after the spindle axis reaches the intermediate speed; and
a torque-command limiting section configured to limit a fluctuation of a torque command of the position control, instructed from the positioning-motion control section to the spindle axis, to a predetermined range over a time period from a point when the spindle axis reaches the intermediate speed to a point when a predetermined elapse condition is satisfied.

2. The controller of claim 1, wherein the decelerating-motion control section is configured to successively update a velocity command for the decelerated rotation with use of the residual rotation amount and the current speed, and to make the spindle axis perform the decelerated rotation by the successively updated velocity command so that the residual rotation amount at an instant when the spindle axis reaches the intermediate speed becomes equal to a positioning rotation amount of the spindle axis required for the spindle axis to reach the target position under the position control.

3. The controller of claim 1, wherein the torque-command limiting section is configured to further limit a fluctuation of a torque command of the velocity control, instructed from the decelerating-motion control section to the spindle axis, to a predetermined range over the time period.

4. The controller of claim 1, wherein the elapse condition comprises at least one of a condition where a predetermined time has elapsed, a condition where the current speed has decreased to a predetermined speed or below, and a condition where the residual rotation amount has decreased to a predetermined rotation amount or below.

5. The controller of claim 1, wherein the starting position corresponds to a process start position of a tapping process, and wherein the target position corresponds to a target thread depth of the tapping process.

6. The controller of claim 5, wherein the positioning-motion control section is configured to make the spindle axis stop at the target thread depth.

7. The controller of claim 5, wherein the positioning-motion control section is configured not to make the spindle axis stop at the target thread depth but to make the spindle axis perform, by a position control, an accelerated inverse rotation at a maximum acceleration of inverse rotation, which is identical to the maximum deceleration, to an initial return position at which the spindle axis has returned by a predetermined rotation number from the target thread depth, after the spindle axis reaches the target thread depth.

8. The controller of claim 1, wherein the starting position corresponds to a target thread depth of a tapping process, and wherein the target position corresponds to a return completion position of the tapping process.

9. A method of controlling a machine tool, configured to control a synchronized operation of a spindle axis and a feed axis, the method comprising the steps, executed by a controller, of:

obtaining, from a tapping program, a total rotation amount and a maximum rotation speed of the spindle axis during a period when the spindle axis operates from a starting position to a target position;

making the spindle axis perform an accelerated rotation at maximum capacity from the starting position, by a velocity control in which the maximum rotation speed is set as a target value;

detecting a maximum acceleration of the spindle axis during the accelerated rotation at maximum capacity, based on a rotational position feedback of the spindle axis;

detecting a residual rotation amount of the spindle axis during a period when the spindle axis operates from a current position to the target position, based on the total rotation amount and the rotational position feedback;

detecting a current speed of the spindle axis based on the rotational position feedback;

executing a velocity control for making the spindle axis perform a decelerated rotation so as to reach a predetermined intermediate speed, after the accelerated rotation at maximum capacity;

executing a position control for making the spindle axis perform a decelerated rotation at a maximum deceleration corresponding to the maximum acceleration so as to reach the target position, based on the residual rotation amount and the current speed, after the spindle axis reaches the intermediate speed; and limiting a fluctuation of a torque command of the position control, instructed to the spindle axis, to a predetermined range over a time period from a point when the spindle axis reaches the intermediate speed to a point when a predetermined elapse condition is satisfied.

10. The method of claim 9, wherein the step of reaching the intermediate speed includes a step of successively updating a velocity command for the decelerated rotation with use of the residual rotation amount and the current speed, and making the spindle axis perform the decelerated rotation by the successively updated velocity command so that the residual rotation amount at an instant when the spindle axis reaches the intermediate speed becomes equal to a positioning rotation amount of the spindle axis required for the spindle axis to reach the target position under the position control.

11. The method of claim 9, wherein the elapse condition comprises at least one of a condition where a predetermined time has elapsed, a condition where the current speed has decreased to a predetermined speed or below, and a condition where the residual rotation amount has decreased to a predetermined rotation amount or below.

12. The method of claim 9, wherein the starting position corresponds to a process start position of a tapping process, and wherein the target position corresponds to a target thread depth of the tapping process.

13. The method of claim 9, wherein the starting position corresponds to a target thread depth of a tapping process, and wherein the target position corresponds to a return completion position of the tapping process.

* * * * *